(12) United States Patent
Chang

(10) Patent No.: US 9,958,632 B2
(45) Date of Patent: May 1, 2018

(54) OPTICAL LENS ASSEMBLY

(71) Applicant: LARGAN PRECISION CO., LTD., Taichung (TW)

(72) Inventor: Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 193 days.

(21) Appl. No.: 14/080,764

(22) Filed: Nov. 14, 2013

(65) Prior Publication Data

US 2015/0098139 A1 Apr. 9, 2015

(30) Foreign Application Priority Data

Oct. 4, 2013 (TW) .............................. 102136062 A

(51) Int. Cl.
*G02B 13/00* (2006.01)
*G02B 7/02* (2006.01)

(52) U.S. Cl.
CPC .................................. *G02B 7/022* (2013.01)

(58) Field of Classification Search
CPC ........ G02B 7/1815; G02B 7/021; G02B 7/02; G02B 3/00; G02B 13/18; G02B 13/003; G02B 7/022; G11B 7/1374
USPC ................. 359/512, 717, 793–796, 811, 819; 369/112.23, 112.24
See application file for complete search history.

(56) References Cited

U.S. PATENT DOCUMENTS 6,466,376 B1* 10/2002 Koshimizu ......... B29C 45/0055
  359/642
2004/0032671 A1* 2/2004 Wada .................... G02B 7/022
  359/819
2009/0290237 A1* 11/2009 Tung ..................... G02B 7/021
  359/796

FOREIGN PATENT DOCUMENTS

| CN | 101387726 A | 3/2009 |
| CN | 101592767 A | 12/2009 |
| CN | 102053325 A | 5/2011 |
| CN | 102445738 A | 5/2012 |
| CN | 202649594 U | 1/2013 |
| TW | 200900364 A | 1/2009 |
| TW | 201224558 A | 6/2012 |
| TW | 201314289 A | 4/2013 |

OTHER PUBLICATIONS

John M. Cavagnaro, "Polymer Optics: Progress in plastic optics follows advances in materials and manufacturing"; Laser Focus World, Sep. 1, 2011, p. 1-8.*

* cited by examiner

*Primary Examiner* — Jie Lei
(74) *Attorney, Agent, or Firm* — CKC & Partners Co., Ltd.

(57) ABSTRACT

An optical lens assembly includes a first lens element and a second lens element. The first lens element has at least one contacting surface. The second lens element has at least one contacting surface. The contacting surface of the first lens element comes in contact with the contacting surface of the second lens element, and at least one air duct is disposed on at least one of the contacting surface of the first lens element and the contacting surface of the second lens element.

22 Claims, 28 Drawing Sheets

OPTICAL LENS ASSEMBLY

RELATED APPLICATIONS

This application claims priority to Taiwan Application Serial Number 102136062, filed Oct. 4, 2013, which is incorporated by reference herein in its entirety.

BACKGROUND

Technical Field

The present disclosure relates to an optical lens assembly. More particularly, the present disclosure relates to an optical lens assembly reducing the tilt of lens elements during assembly.

Description of Related Art

As the compact optical systems have gradually evolved toward the field of higher megapixels, there is an increasing demand for compact optical systems featuring better image quality. Moreover, the image quality will be influenced by optical system design, molding, and assembly. Especially, the tilt of the lens elements during assembly can significantly degrade the optical performance of the optical systems. When the lens elements reside in a very compact optical structure, it can easily result in the tilt of the lens elements during assembly. Since the lens elements have no air duct(s) to exhaust the internal air, it is thereby not favorable for assembling and reduces the optical performance.

FIG. 1A is a cross-sectional view of one conventional optical system. The conventional optical system includes a first lens element 10 and a second lens element 20. The first lens element 10 includes a first contacting surface 11, and the second lens element 20 includes a first contacting surface 21, wherein the first contacting surface 11 of the first lens element 10 comes in contact with the first contacting surface 21 of the second lens element 20, and an enclosed air cavity 70 is formed between the first lens element 10 and the second lens element 20.

FIG. 1B is a cross-sectional view of another conventional optical system and the cross-sectional position of FIG. 1B is correspondent to a part S in FIG. 1A. This conventional optical system includes a first lens element 30 and a second lens element 40. The first lens element 30 includes a first contacting surface 31 and a second contacting surface 32, and the second lens element 40 includes a first contacting surface 41 and a second contacting surface 42, wherein the first contacting surface 31 of the first lens element 30 comes in contact with the first contacting surface 41 of the second lens element 40; the second contacting surface 32 of the first lens element 30 comes in contact with the second contacting surface 42 of the second lens element 40; and an enclosed air cavity 80 is formed between the first lens element 30 and the second lens element 40.

FIG. 1C is a cross-sectional view of still another conventional optical system and the cross-sectional position of FIG. 1C is correspondent to the part S in FIG. 1A. This conventional optical system includes a first lens element 50 and a second lens element 60. The first lens element 50 includes a first contacting surface 51, a second contacting surface 52 and a third contacting surface 53, and the second lens element 60 includes a first contacting surface 61, a second contacting surface 62 and a third contacting surface 63, wherein the first contacting surface 51 of the first lens element 50 comes in contact with the first contacting surface 61 of the second lens element 60; the second contacting surface 52 of the first lens element 50 comes in contact with the second contacting surface 62 of the second lens element 60; the third contacting surface 53 of the first lens element 50 comes in contact with the third contacting surface 63 of the second lens element 60; and an enclosed air cavity 90 is formed between the first lens element 50 and the second lens element 60.

In FIG. 1A to FIG. 1C, the conventional optical systems have contacting surfaces in contact with each other to improve assembly stability. However, as there is an increasing demand for the optical systems featuring a compact size and the air cavity between lens elements is enclosed. Therefore, this compact optical structure makes the air cavity with more air pressure. It thereby tends to result in the tilt of the lens elements during assembly, and is not favorable for assembling and reduces the optical performance.

SUMMARY

According to one aspect of the present disclosure, an optical lens assembly includes a first lens element and a second lens element. The first lens element has at least one contacting surface. The second lens element has at least one contacting surface. The contacting surface of the first lens element comes in contact with the contacting surface of the second lens element, and at least one air duct is disposed on at least one of the contacting surface of the first lens element and the contacting surface of the second lens element.

BRIEF DESCRIPTION OF THE DRAWINGS

The disclosure can be more fully understood by reading the following detailed description of the embodiments, with reference made to the accompanying drawings as follows.

DETAILED DESCRIPTION

An optical lens assembly includes a first lens element and a second lens element. The first lens element has at least one contacting surface and the second lens element has at least one contacting surface. The contacting surface of the first lens element comes in contact with the contacting surface of the second lens element, and at least one air duct is disposed on at least one of the contacting surface of the first lens element and the contacting surface of the second lens element.

Figure 1A:
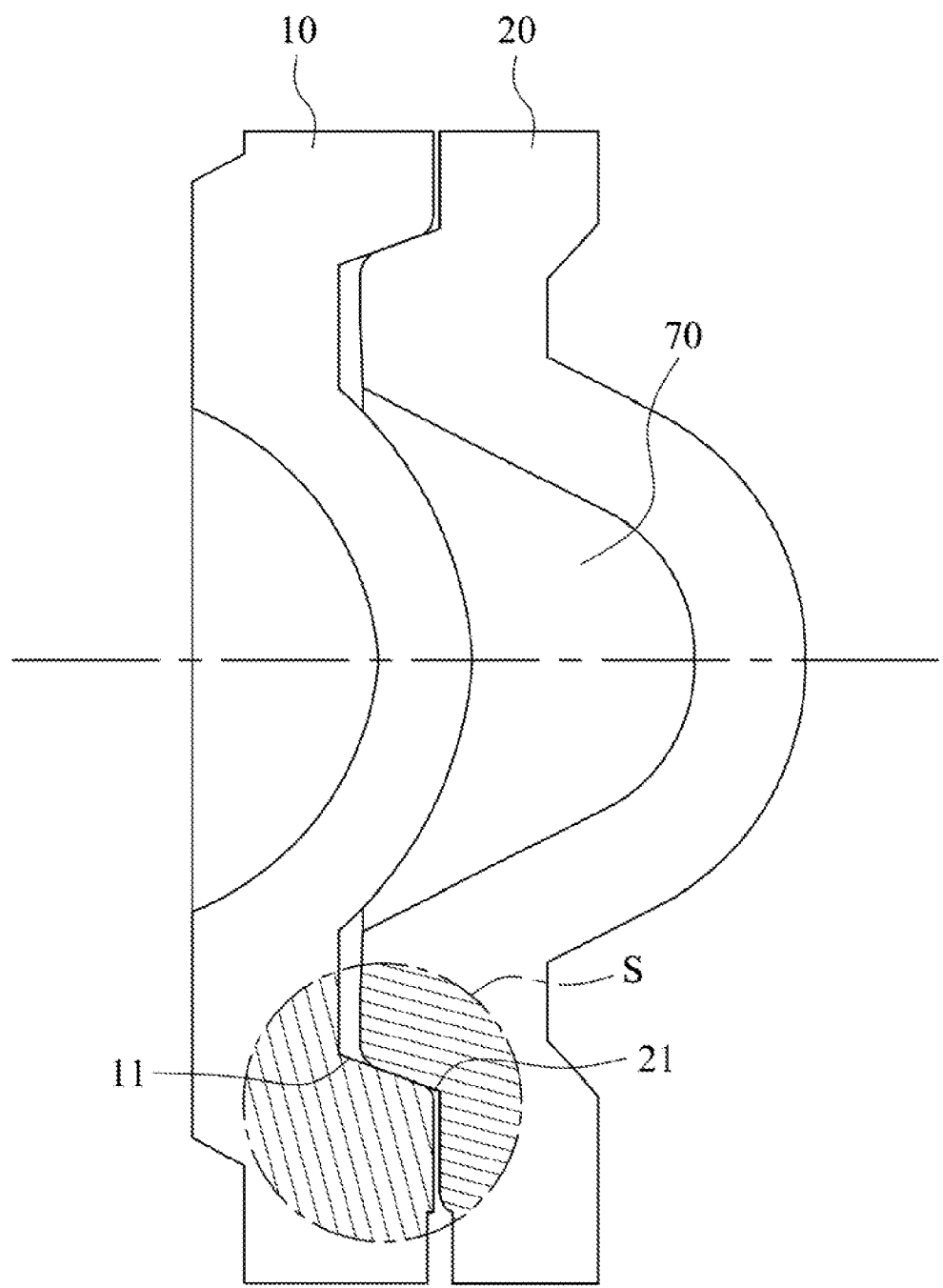
FIG. 1A is a cross-sectional view of one conventional optical system.
Figure 1B:
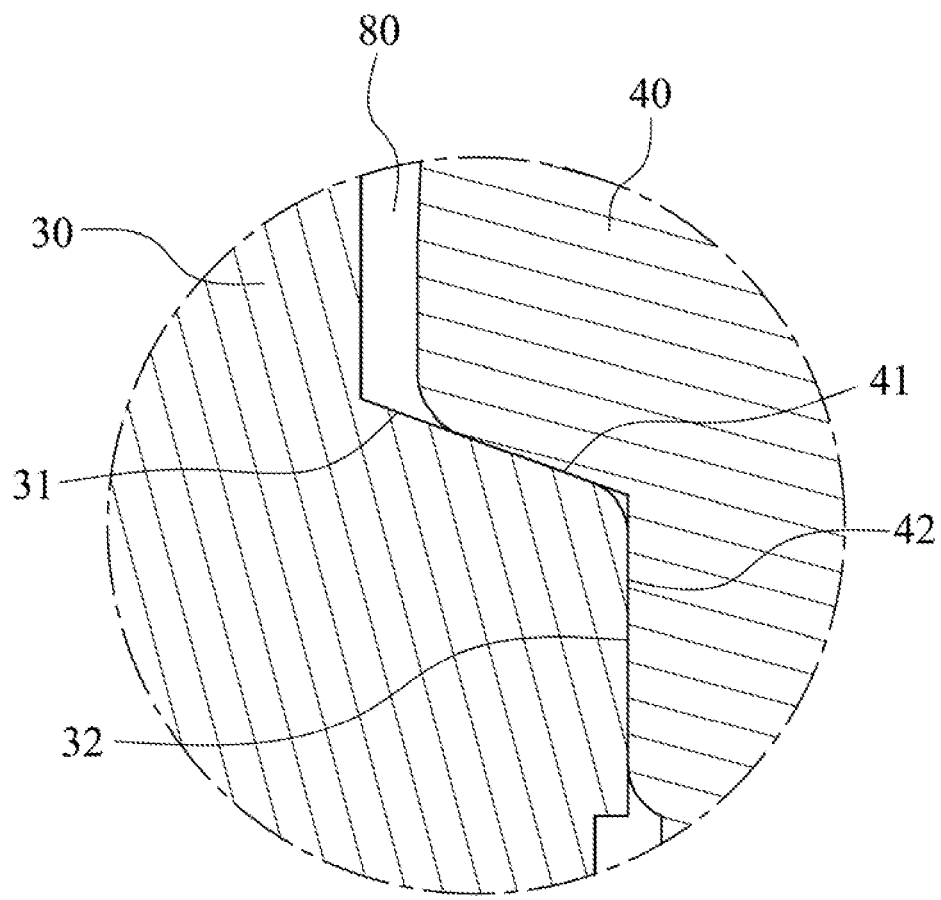
FIG. 1B is a cross-sectional view of another conventional optical system.
Figure 1C:
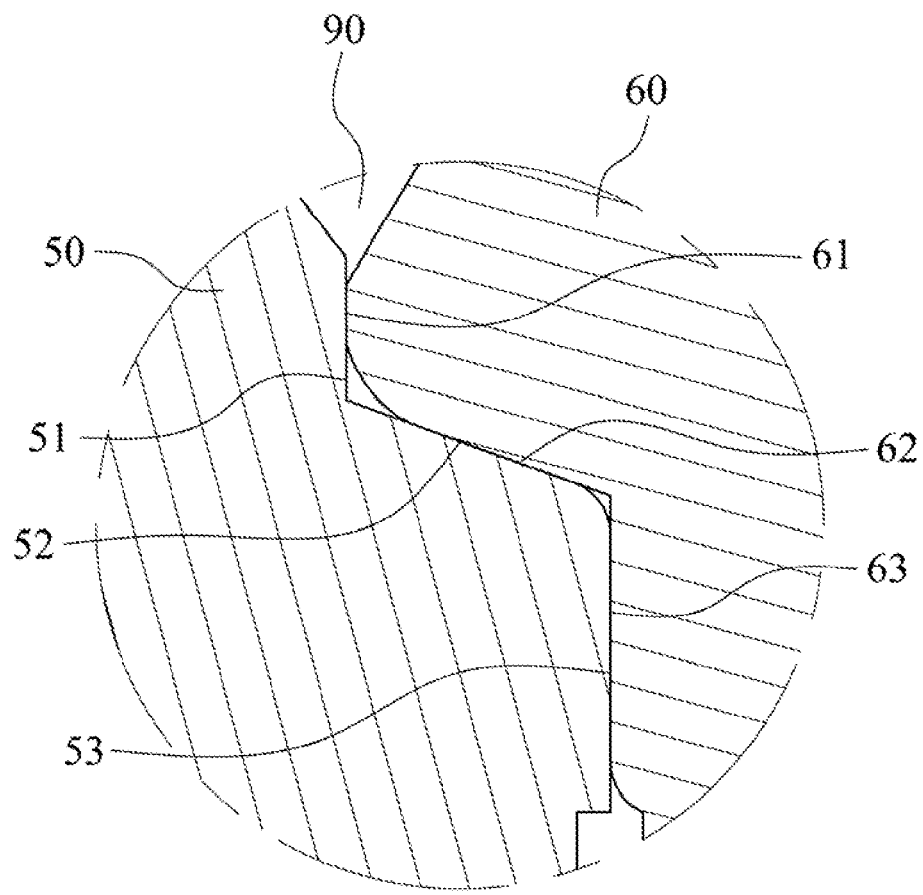
FIG. 1C is a cross-sectional view of still another conventional optical system.

The air duct is for communicating an inside part of the optical lens assembly and an outside part. The "inside part" refers to an enclosed air cavity (is correspondent to the air cavity 70 of FIG. 1A) formed by the first lens element coming in contact with the second lens element. The "outside part" refers to an outside open space which is outside the contacting surface when the first lens element comes in contact with the second lens element. As a result, when the first lens element comes in contact with the second lens element during assembly, the air duct can thereby exhaust the excess air from the air cavity effectively. It is thereby favorable for reducing assembly errors during assembly, and is favorable for assembling and improving image quality.

The air duct can be disposed on the contacting surface of the first lens element. The first lens element can include a parting line, wherein the air duct of the first lens element is closer to the optical axis than the parting line. It is favorable for exhausting the excess air from the air cavity so as to reduce the tilt of the lens elements caused by the air pressure during assembly.

Another air duct can be disposed on the contacting surface of the second lens element. The second lens element can include a parting line, wherein the air duct of the second lens element is closer to the optical axis than the parting line. It is favorable for exhausting the excess air from the air cavity so as to reduce the tilt of the lens elements caused by the air pressure during assembly.

When a surface roughness of the contacting surface where the air duct is disposed on is SR, the following condition is satisfied: $SR \leq 0.1$ μm. Therefore, this processed surface of the lens element is favorable for the lens element in contact with other lens elements more precisely. It is also favorable for the lens elements of the optical lens assembly being aligned with the optical axis more correctly, reducing assembly errors so as to keep the image quality in a stable manner. Preferably, the following condition is satisfied: $SR \leq 0.01$ μm.

According to the optical lens assembly of the present disclosure, the lens elements thereof can be made of plastic material. Therefore, the manufacturing cost can be effectively reduced.

When a maximum depth of the air duct is H, the following condition is satisfied: $0.005 \text{ mm} \leq H \leq 0.500 \text{ mm}$. Therefore, it is favorable for maintaining the stability when the contacting surfaces come in contact with each other and increasing the efficiency of exhausting air. Preferably, the following condition is satisfied: $0.008 \text{ mm} \leq H \leq 0.150 \text{ mm}$.

When a curvature radius of a bottom of the air duct is R, the following condition is satisfied: $R > 0$ mm. Therefore, it is favorable for molding and manufacturing the lens elements.

When the bottom of the air duct forms a V shape, it is favorable for molding and manufacturing of lens elements and improving the efficiency of exhausting the excess air from the air cavity.

The first lens element can include at least two contacting surfaces, wherein the two contacting surfaces are adjacent and form an included angle θ, the aforementioned "included angle" refers to a right or an obtuse angle formed by two contacting surfaces, the following condition is satisfied: $90 \text{ degrees} \leq \theta < 180 \text{ degrees}$. Therefore, it is favorable for increasing the contact area so as to improve the support of the contacting surfaces. Preferably, the following condition is satisfied: $90 \text{ degrees} \leq \theta < 145 \text{ degrees}$.

According to the above description of the present disclosure, the following 1st-12th specific embodiments are provided for further explanation.

1st Embodiment

Figure 2A:
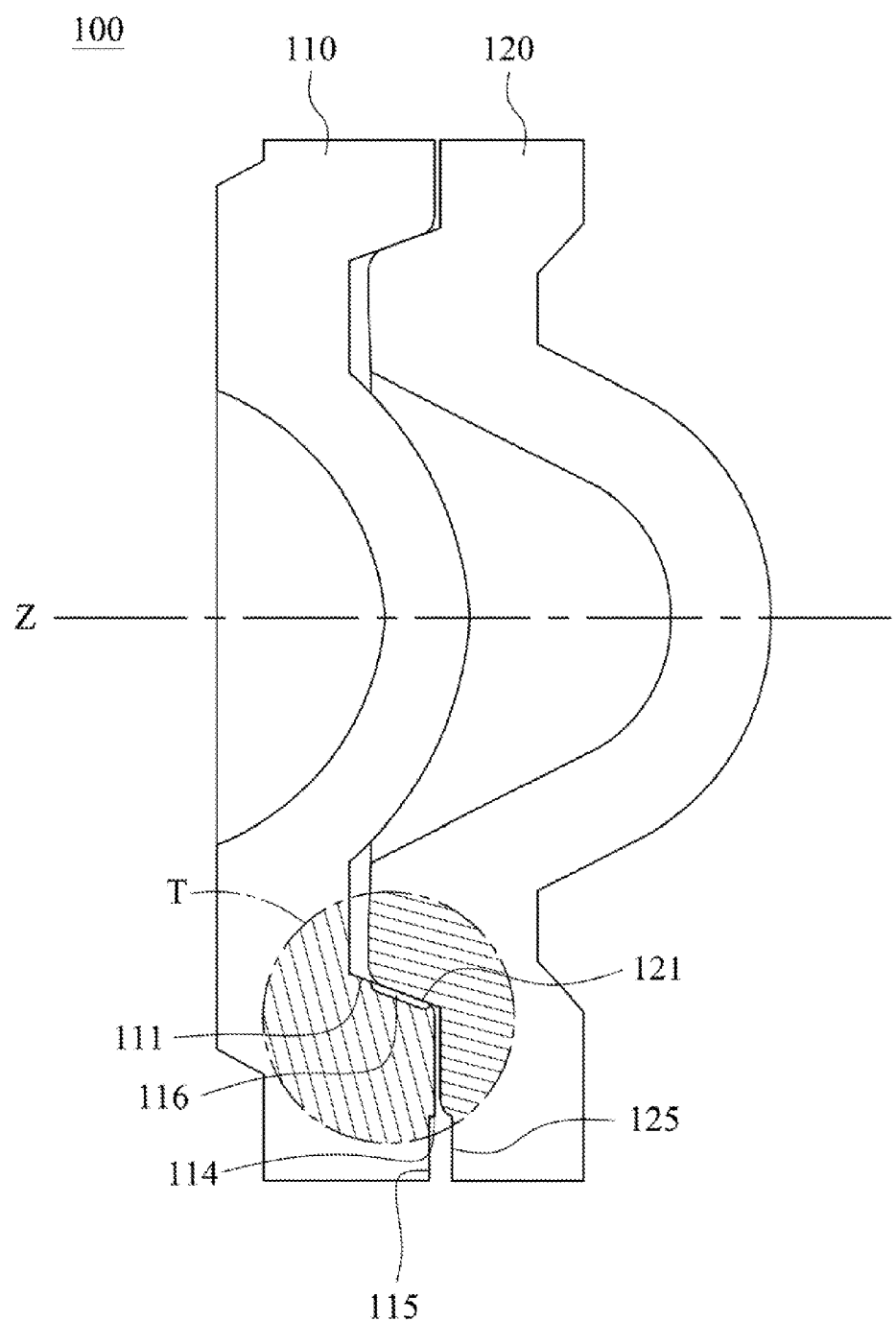
FIG. 2A is a cross-sectional view of an optical lens assembly according to the 1st embodiment of the present disclosure.
Figure 2B:
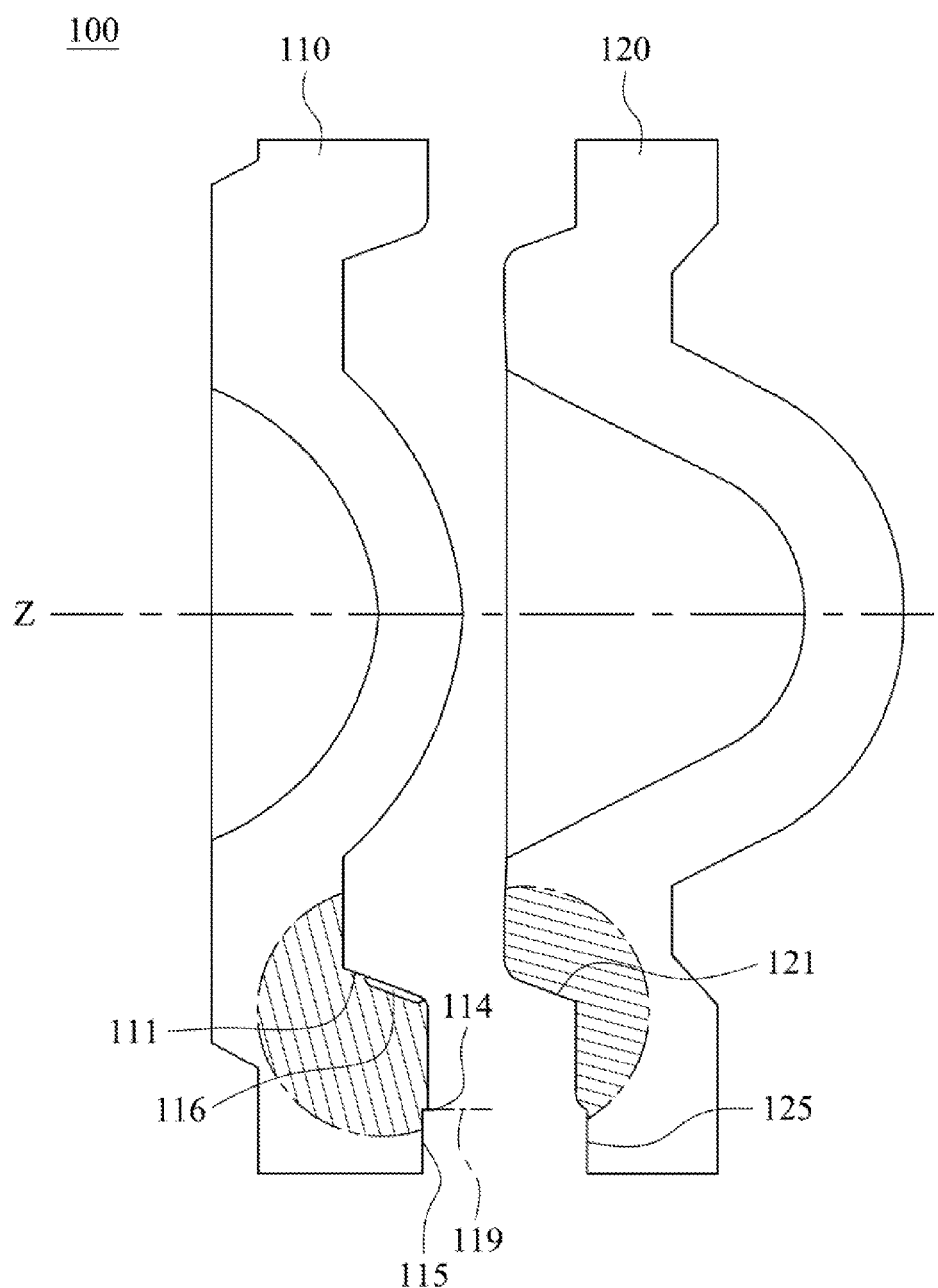
FIG. 2B is an exploded view of the optical lens assembly in FIG. 2A.
Figure 2C:
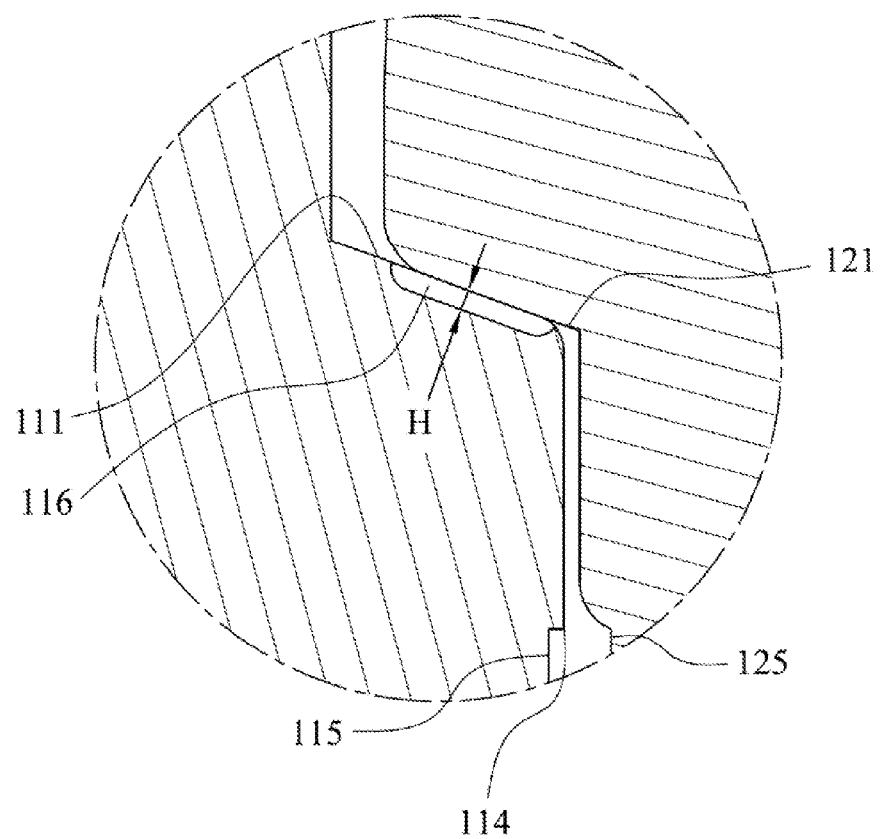
FIG. 2C is an enlarged view of a part T in FIG. 2A.

FIG. 2A is a cross-sectional view of an optical lens assembly 100 according to the 1st embodiment of the present disclosure. FIG. 2B is an exploded view of the optical lens assembly 100 in FIG. 2A. FIG. 2C is an enlarged view of a part T in FIG. 2A. The optical lens assembly 100 includes a first lens element 110 and a second lens element 120.

The first lens element 110 made of plastic material includes a first contacting surface 111, a parting line 114, an air duct 116 and an outer surface 115, wherein the outer surface 115 is located on the outer region of the first lens element 110, and the outer surface 115 and the parting line 114 have a level difference. Furthermore, an extended plane of the parting line 114 parallel with an optical axis Z is a parting plane 119.

The second lens element 120 made of plastic material includes a first contacting surface 121 and an outer surface 125, wherein the outer surface 125 is located on the outer region of the second lens element 120.

The first contacting surface 111 of the first lens element 110 comes in contact with the first contacting surface 121 of the second lens element 120. The air duct 116 is disposed on the first contacting surface 111 of the first lens element 110, and the air duct 116 is closer to the center of the first lens element 110 than the parting line 114. Furthermore, a maximum depth of the air duct 116 is H, H=0.0465 mm. A surface roughness of the first contacting surface 111 of the first lens element 110 is SR, SR=0.1 μm.

2nd Embodiment

Figure 3:
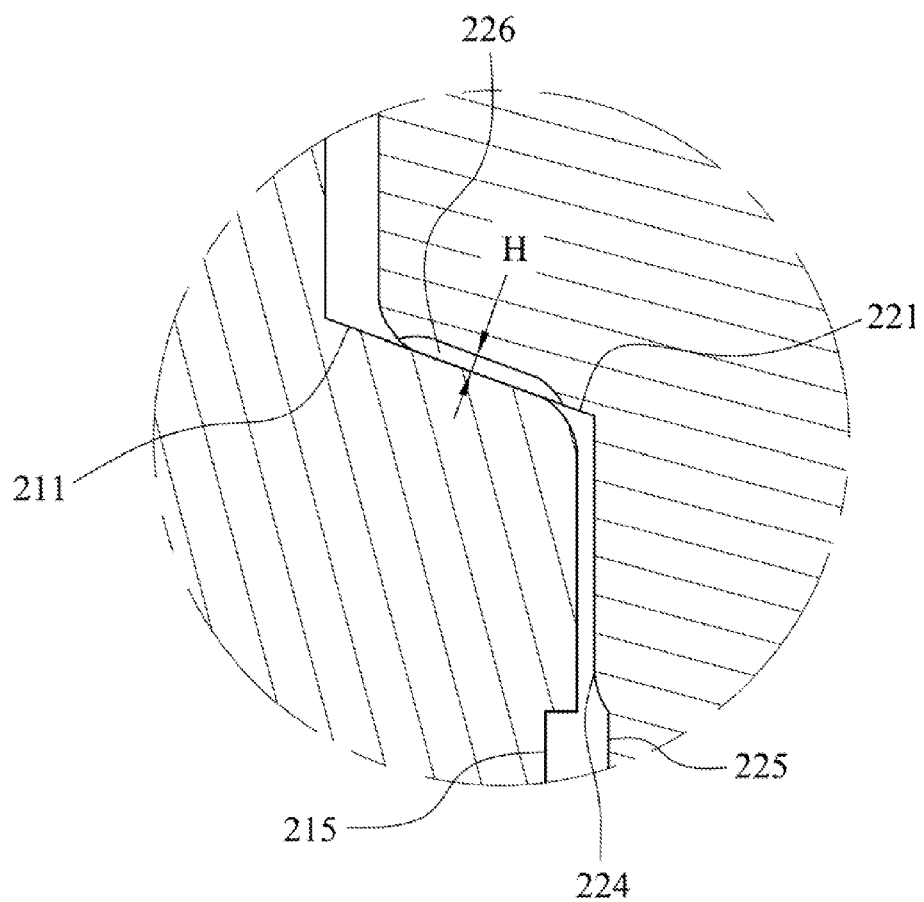
FIG. 3 is a partial cross-sectional view of an optical lens assembly according to the 2nd embodiment of the present disclosure.

FIG. 3 is a partial cross-sectional view of an optical lens assembly according to the 2nd embodiment of the present disclosure. A position of the partial cross-sectional view shown in FIG. 3 is correspondent to the position shown in FIG. 2C. The optical lens assembly includes a first lens element and a second lens element.

The first lens element made of plastic material includes a first contacting surface 211 and an outer surface 215, wherein the outer surface 215 is located on the outer region of the first lens element.

The second lens element made of plastic material includes a first contacting surface 221, a parting line 224 and an outer surface 225, wherein the outer surface 225 is located on the outer region of the second lens element, and the outer surface 225 and the parting line 224 have a level difference. Furthermore, an extended plane of the parting line 224 parallel with an optical axis Z is a parting plane (not otherwise herein provided).

The first contacting surface 211 of the first lens element comes in contact with the first contacting surface 221 of the second lens element. An air duct 226 is disposed on the first contacting surface 221 of the second lens element, and the air duct 226 is closer to the center of the second lens element than the parting line 224. Furthermore, a maximum depth of the air duct 226 is H, H=0.0699 mm. A surface roughness of the first contacting surface 221 of the second lens element is SR, SR=0.05 μm.

3rd Embodiment

Figure 4:
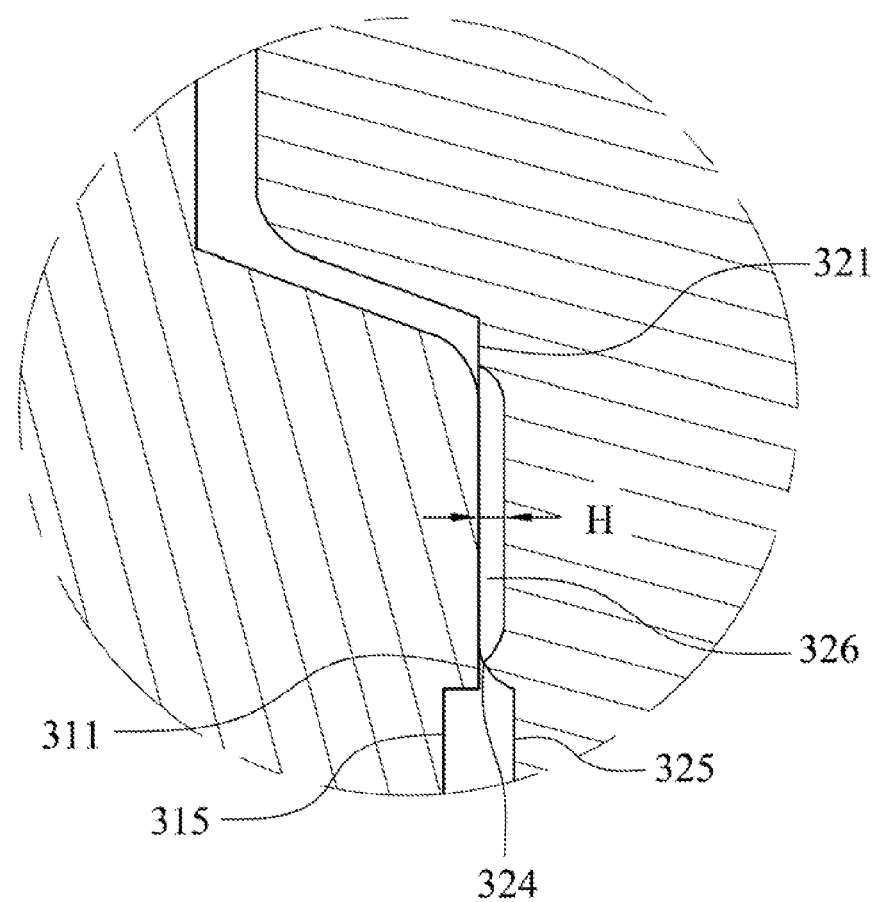
FIG. 4 is a partial cross-sectional view of an optical lens assembly according to the 3rd embodiment of the present disclosure.

FIG. 4 is a partial cross-sectional view of an optical lens assembly according to the 3rd embodiment of the present disclosure. A position of the partial cross-sectional view shown in FIG. 4 is correspondent to the position shown in FIG. 2C. The optical lens assembly includes a first lens element and a second lens element.

The first lens element made of plastic material includes a first contacting surface 311 and an outer surface 315, wherein the outer surface 315 is located its on the outer region of the first lens element.

The second lens element made of plastic material includes a first contacting surface 321, a parting line 324 and an outer surface 325, wherein the outer surface 325 is located on the outer region of the second lens element, and the outer surface 325 and the parting line 324 have a level difference. Furthermore, an extended plane of the parting line 324 parallel with an optical axis Z is a parting plane (not otherwise herein provided).

The first contacting surface 311 of the first lens element comes in contact with the first contacting surface 321 of the second lens element. An air duct 326 is disposed on the first contacting surface 321 of the second lens element, and the air duct 326 is closer to the center of the second lens element than the parting line 324. Furthermore, a maximum depth of the air duct 326 is H, H=0.0908 mm. A surface roughness of the first contacting surface 321 of the second lens element is SR, SR=0.002 μm.

4th Embodiment

Figure 5:
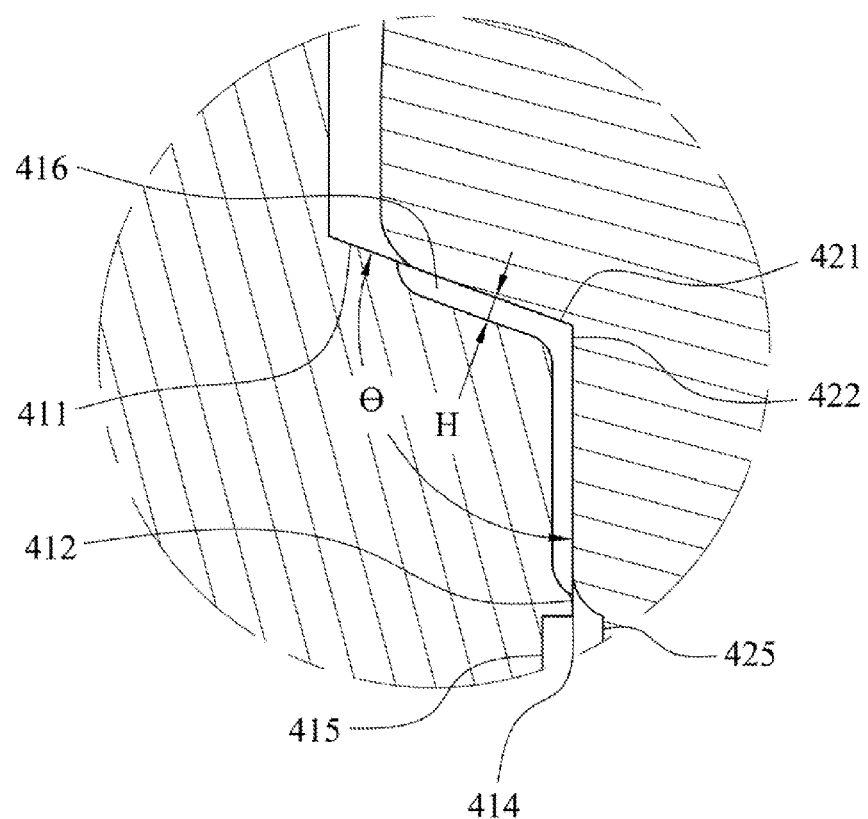
FIG. 5 is a partial cross-sectional view of an optical lens assembly according to the 4th embodiment of the present disclosure.

FIG. 5 is a partial cross-sectional view of an optical lens assembly according to the 4th embodiment of the present disclosure. A position of the partial cross-sectional view shown in FIG. 5 is correspondent to the position shown in FIG. 2C. The optical lens assembly includes a first lens element and a second lens element.

The first lens element made of plastic material includes a first contacting surface 411, a second contacting surface 412, a parting line 414 and an outer surface 415, wherein the outer surface 415 is located on the outer region of the first lens element, and the outer surface 415 and the parting line 414 have a level difference. Furthermore, an extended plane of the parting line 414 parallel with an optical axis Z is a parting plane (not otherwise herein provided).

The second lens element made of plastic material includes a first contacting surface 421, a second contacting surface 422 and an outer surface 425, wherein the outer surface 425 is located on the outer region of the second lens element.

The first contacting surface 411 of the first lens element comes in contact with the first contacting surface 421 of the second lens element. The second contacting surface 412 of the first lens element comes in contact with the second contacting, surface 422 of the second lens element. An air duct 416 is disposed on both of the first contacting surface 411 of the first lens element and the second contacting surface 412 of the first lens element, and the air duct 416 is closer to the center of the first lens element than the parting line 414. Furthermore, a maximum depth of the air duct 416 is H, H=0.0465 mm. A surface roughness of both of the first contacting surface 411 of the first lens element and the second contacting surface 412 of the first lens element is SR, SR=0.01 μm. An included angle formed by the first contacting surface 411 of the first lens element and the second contacting surface 412 of the first lens element is θ, θ=120 degrees.

5th Embodiment

Figure 6:
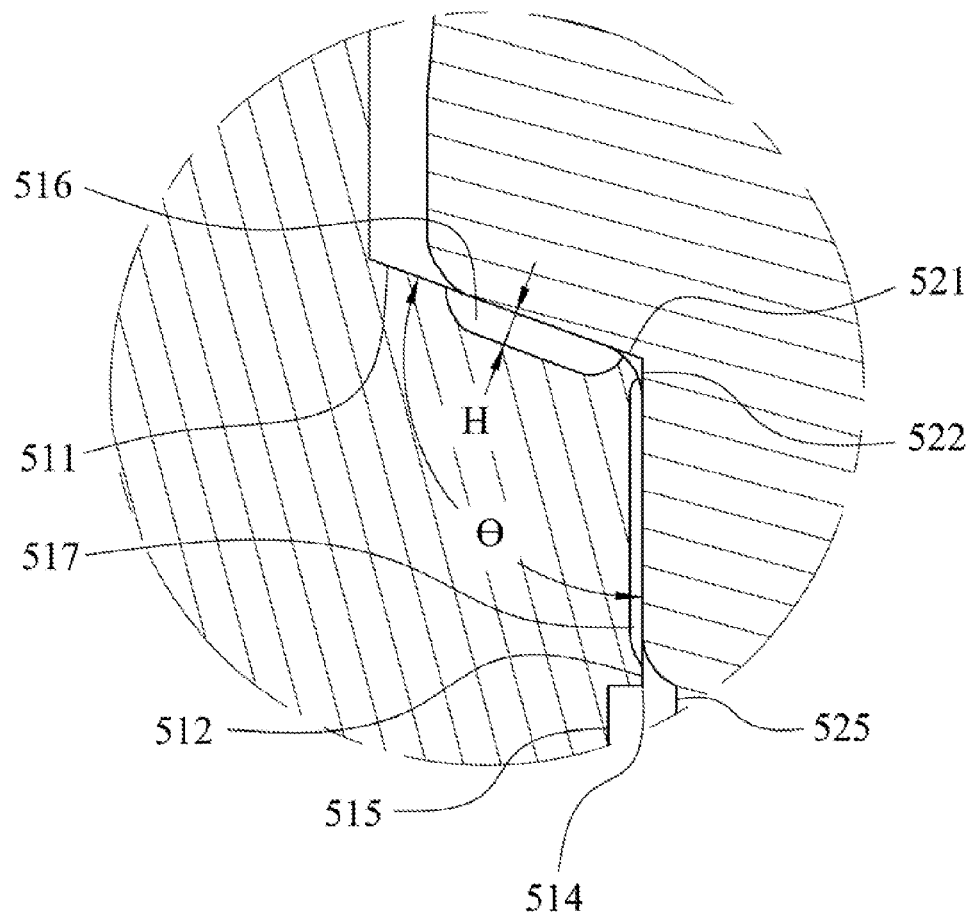
FIG. 6 is a partial cross-sectional view of an optical lens assembly according to the 5th embodiment of the present disclosure.

FIG. 6 is a partial cross-sectional view of an optical lens assembly according to the 5th embodiment of the present disclosure. A position of the partial cross-sectional view shown in FIG. 6 is correspondent to the position shown in FIG. 2C. The optical lens assembly includes a first lens element and a second lens element.

The first lens element made of plastic material includes a first contacting surface 511, a second contacting surface 512, a parting line 514 and an outer surface 515, wherein the outer surface 515 is located on the outer region of the first lens element, and the outer surface 515 and the parting line 514 have a level difference. Furthermore, an extended plane of the parting line 514 parallel with an optical axis Z is a parting plane (not otherwise herein provided).

The second lens element made of plastic material includes a first contacting surface 521, a second contacting surface 522 and an outer surface 525, wherein the outer surface 525 is located on the outer region of the second lens element.

The first contacting surface 511 of the first lens element comes in contact with the first contacting surface 521 of the second lens element. The second contacting surface 512 of the first lens element comes in contact with the second contacting surface 522 of the second lens element. An air duct 516 is disposed on the first contacting surface 511 of the first lens element, and another air duct 517 is disposed on the second contacting surface 512 of the first lens element. Both of the air duct 516 and the air duct 517 are closer to the center of the first lens element than the parting line 514. Furthermore, a maximum depth of the air duct 516 is H, H=0.1261 mm. A surface roughness of both of the first contacting surface 511 of the first lens element and the second contacting surface 512 of the first lens element is SR, SR=0.2 μm. An included angle formed by the first contacting surface 511 of the first lens element and the second contacting surface 512 of the first lens element is θ, θ=120 degrees.

6th Embodiment

Figure 7:
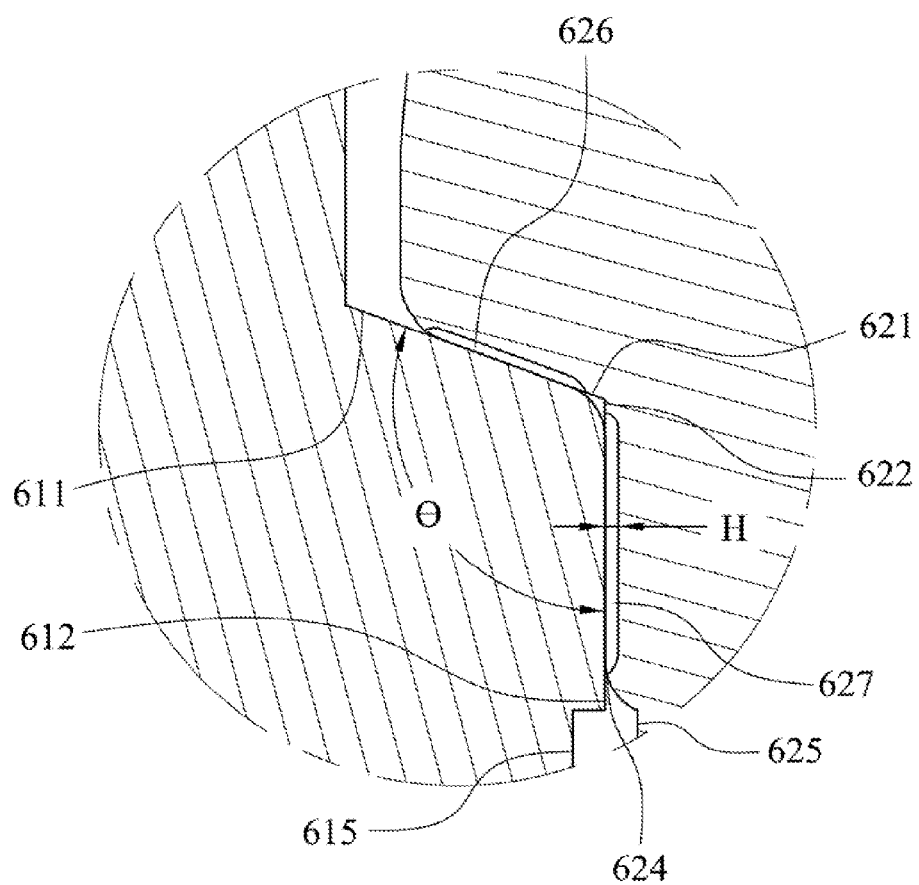
FIG. 7 is a partial cross-sectional view of an optical lens assembly according to the 6th embodiment of the present disclosure.

FIG. 7 is a partial cross-sectional view of an optical lens assembly according to the 6th embodiment of the present disclosure. A position of the partial cross-sectional view shown in FIG. 7 is correspondent to the position shown in FIG. 2C. The optical lens assembly includes a first lens element and a second lens element.

The first lens element made of plastic material includes a first contacting surface 611, a second contacting surface 612, and an outer surface 615, wherein the outer surface 615 is located on the outer region of the first lens element.

The second lens element made of plastic material includes a first contacting surface 621, a second contacting surface 622, a parting line 624 and an outer surface 625, wherein the outer surface 625 is located on the outer region of the second lens element, and the outer surface 625 and the parting line 624 have a level difference. Furthermore, an extended plane of the parting line 624 parallel with an optical axis Z is a parting plane (not otherwise herein provided).

The first contacting surface 611 of the first lens element comes in contact with the first contacting surface 621 of the second lens element. The second contacting surface 612 of the first lens element comes in contact with the second contacting surface 622 of the second lens element. An air duct 626 is disposed on the first contacting surface 621 of the second lens element, and another air duct 627 is disposed on the second contacting surface 622 of the second lens element. Both of the air duct 626 and the air duct 627 are closer to the center of the second lens element than the parting line 624. Furthermore, a maximum depth of the air duct 627 is H, H=0.0295 mm. A surface roughness of both of the first contacting surface 621 of the second lens element and the second contacting surface 622 of the second lens element is SR, SR=0.008 μm. An included angle formed by the first contacting surface 621 of the second lens element and the second contacting surface 622 of the second lens element is θ, θ=120 degrees.

7th Embodiment

Figure 8:
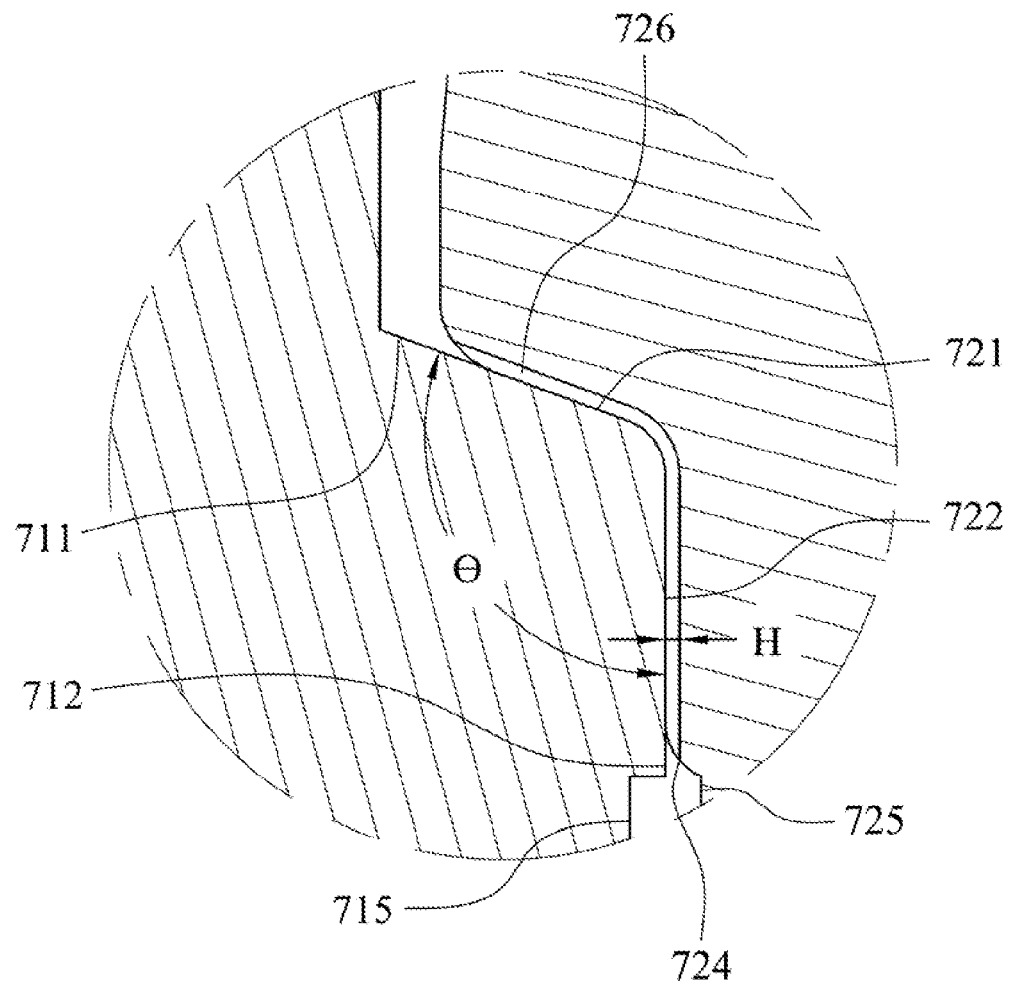
FIG. 8 is a partial cross-sectional view of an optical lens assembly according to the 7th embodiment of the present disclosure.

FIG. 8 is a partial cross-sectional view of an optical lens assembly according to the 7th embodiment of the present disclosure. A position of the partial cross-sectional view shown in FIG. 8 is correspondent to the position shown in FIG. 2C. The optical lens assembly includes a first lens element and a second lens element.

The first lens element made of plastic material includes a first contacting surface 711, a second contacting surface 712 and an outer surface 715, wherein the outer surface 715 is located on the outer region of the first lens element.

The second lens element made of plastic material includes a first contacting surface 721, a second contacting surface 722, a parting line 724 and an outer surface 725, wherein the outer surface 725 is located on the outer region of the second lens element, and the outer surface 725 and the parting line 724 have a level difference. Furthermore, an extended plane of the parting line 724 parallel with an optical axis Z is a parting plane (not otherwise herein provided).

The first contacting surface 711 of the first lens element comes in contact with the first contacting surface 721 of the second lens element. The second contacting surface 712 of the first lens element comes in contact with the second contacting surface 722 of the second lens element. An air duct 726 is disposed on both of the first contacting surface 721 of the second lens element and the second contacting surface 722 of the second lens element, and the air duct 726 is closer to the center of the second lens element than the parting, line 724. Furthermore, a maximum depth of the air duct 726 is H, H=0.0506 mm. A surface roughness of both of the first contacting surface 721 of the second lens element and the second contacting surface 722 of the second lens element is SR, SR=0.06 μm. An included angle formed by the first contacting surface 721 of the second lens element and the second contacting surface 722 of the second lens element is θ, θ=120 degrees.

8th Embodiment

Figure 9:
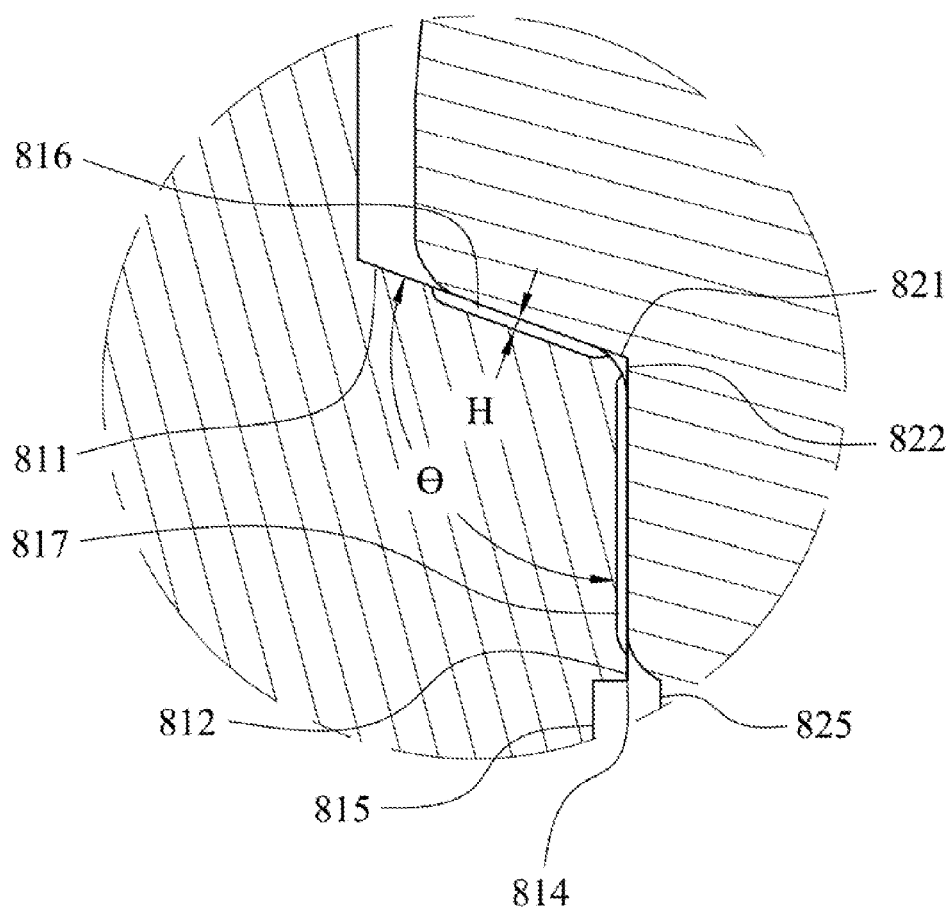
FIG. 9 is a partial cross-sectional view of an optical lens assembly according to the 8th embodiment of the present disclosure.

FIG. 9 is a partial cross-sectional view of an optical lens assembly according to the 8th embodiment of the present disclosure. A position of the partial cross-sectional view shown in FIG. 9 is correspondent to the position shown in FIG. 2. The optical lens assembly includes a first lens element and a second lens element.

The first lens element made of plastic material includes a first contacting surface 811, a second contacting surface 812, a parting line 814 and an outer surface 815, wherein the outer surface 815 is located on the outer region of the first lens element, and the outer surface 815 and the parting line 814 have a level difference. Furthermore, an extended plane of the parting line 814 parallel with an optical axis Z is a parting plane (not otherwise herein provided).

The second lens element made of plastic material includes a first contacting surface 821, a second contacting surface 822 and an outer surface 825, wherein the outer surface 825 is located on the outer region of the second lens element.

The first contacting surface 811 of the first lens element comes in contact with the first contacting surface 821 of the second lens element. The second contacting surface 812 of the first lens element comes in contact with the second contacting, surface 822 of the second lens element. An air duct 816 is disposed on the first contacting surface 811 of the first lens element and another air duct 817 is disposed on the second contacting surface 812 of the first lens element. Both of the air duct 816 and the air duct 817 are closer to the center of the first lens element than the parting line 814. Furthermore, a maximum depth of the air duct 816 is H, H=0.0095 mm. A surface roughness of both of the first contacting surface 811 of the first lens element and the second contacting surface 812 of the first lens element is SR, SR=0.04 μm. An included angle formed by the first contacting surface 811 of the first lens element and the second contacting surface 812 of the first lens element is θ, θ=120 degrees.

9th Embodiment

Figure 10:
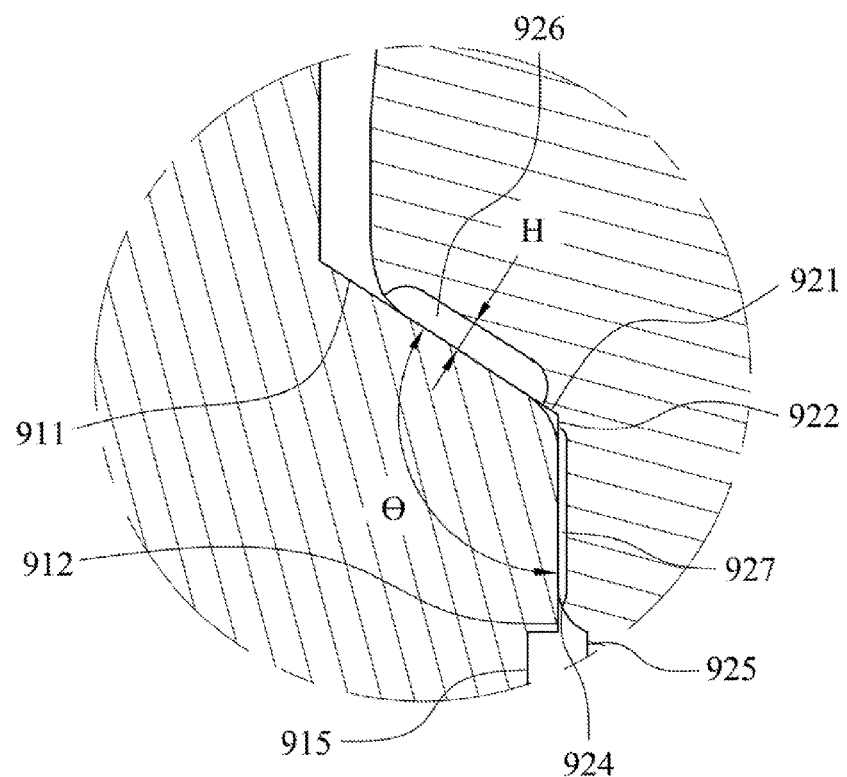
FIG. 10 is a partial cross-sectional view of an optical lens assembly according to the 9th embodiment of the present disclosure.

FIG. 10 is a partial cross-sectional view of an optical lens assembly according to the 9th embodiment of the present disclosure. A position of the partial cross-sectional view shown in FIG. 10 is correspondent to the position shown in FIG. 2C. The optical lens assembly includes a first lens element and a second lens element.

The first lens element made of plastic material includes a first contacting surface 911, a second contacting surface 912, and an outer surface 915, wherein the outer surface 915 is located on the outer region of the first lens element.

The second lens element made of plastic material includes a first contacting surface 921, a second contacting surface 922, a parting line 924 and an outer surface 925, wherein the outer surface 925 is located on the outer region of the second lens element, and the outer surface 925 and the parting line 924 have a level difference. Furthermore, an extended plane of the parting line 924 parallel with an optical axis Z is a parting plane (not otherwise herein provided).

The first contacting surface 911 of the first lens element comes in contact with the first contacting surface 921 of the second lens element. The second contacting surface 912 of the first lens element comes in contact with the second contacting surface 922 of the second lens element. An air duct 926 is disposed on the first contacting surface 921 of the second lens element, and another air duct 927 is disposed on the second contacting surface 922 of the second lens element. Both of the air duct 926 and the air duct 927 are closer to the center of the second lens element than the parting line 924. Furthermore, a maximum depth of the air duct 926 is H, H=0.1314 mm. A surface roughness of both of the first contacting surface 921 of the second lens element and the second contacting surface 922 of the second lens element is SR, SR=0.003 μm. An included angle formed by the first contacting surface 911 of the first lens element and the second contacting surface 912 of the first lens element is θ, θ=122.9 degrees.

10th Embodiment

Figure 11:
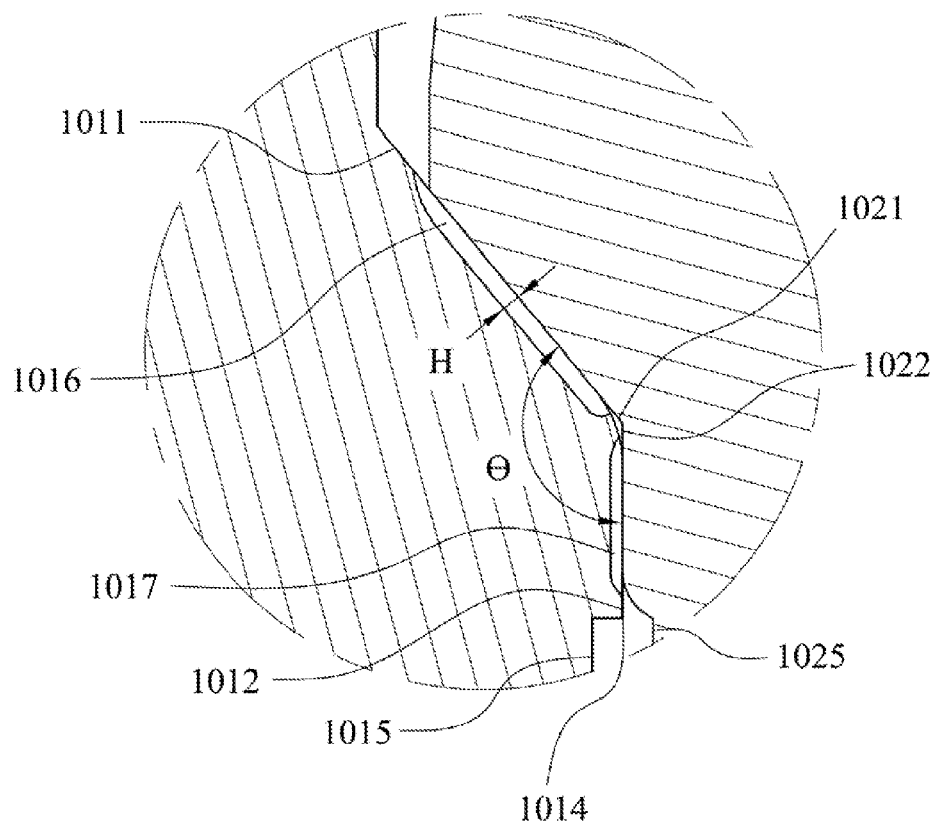
FIG. 11 is a partial cross-sectional view of an optical lens assembly according to the 10th embodiment of the present disclosure.

FIG. 11 is a partial cross-sectional view of an optical lens assembly according to the 10th embodiment of the present disclosure. A position of the partial cross-sectional view shown in FIG. 11 is correspondent to the position shown in FIG. 2C. The optical lens assembly includes a first lens element and a second lens element.

The first lens element made of plastic material includes a first contacting surface 1011, a second contacting surface 1012, a parting line 1014 and an outer surface 1015, wherein the outer surface 1015 is located on the outer region of the first lens element, and the outer surface 1015 and the parting line 1014 have a level difference. Furthermore, an extended plane of the parting line 1014 parallel with an optical axis Z is a parting plane (not otherwise herein provided).

The second lens element made of plastic material includes a first contacting surface 1021, a second contacting surface 1022 and an outer surface 1025, wherein the outer surface 1025 is located on the outer region of the second lens element.

The first contacting surface 1011 of the first lens element comes in contact with the first contacting surface 1021 of the second lens element. The second contacting surface 1012 of the first lens element comes in contact with the second contacting surface 1022 of the second lens element. An air duct 1016 is disposed on the first contacting surface 1011 of the first lens element, and another air duct 1017 is disposed on the second contacting surface 1012 of the first lens element. Both of the air duct 1016 and the air duct 1017 are closer to the center of the first lens element than the parting line 1014. Furthermore, a maximum depth of the air duct 1016 is H, H=0.0218 mm. A surface roughness of both of the first contacting surface 1011 of the first lens element and the second contacting surface 1012 of the first lens element is SR, SR=0.002 μm. An included angle formed by the first contacting surface 1011 of the first lens element and the second contacting surface 1012 of the first lens element is θ, θ=140.5 degrees.

11th Embodiment

Figure 12:
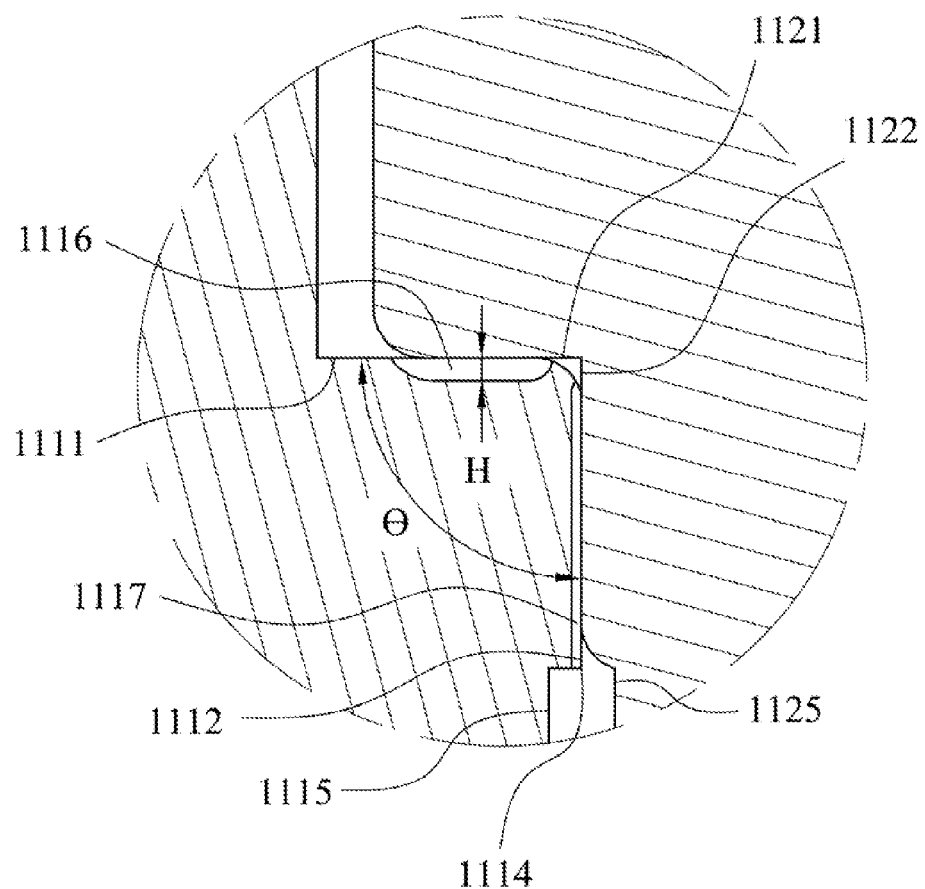
FIG. 12 is a partial cross-sectional view of an optical lens assembly according to the 11th embodiment of the present disclosure.

FIG. 12 is a partial cross-sectional view of an optical lens assembly according to the 11th embodiment of the present disclosure. A position of the partial cross-sectional view shown in FIG. 12 is correspondent to the position shown in FIG. 2C. The optical lens assembly includes a first lens element and a second lens element.

The first lens element made of plastic material includes a first contacting surface 1111, a second contacting surface 1112, a parting line 1114 and an outer surface 1115, wherein the outer surface 1115 is located on the outer region of the first lens element, and the outer surface 1115 and the parting line 1114 have a level difference. Furthermore, an extended plane of the parting line 1114 parallel with an optical axis Z is a parting plane (not otherwise herein provided).

The second lens element made of plastic material includes a first contacting surface 1121, a second contacting surface 1122 and an outer surface 1125, wherein the outer surface 1125 is located on the outer region of the second lens element.

The first contacting surface 1111 of the first lens element comes in contact with the first contacting surface 1121 of the second lens element. The second contacting surface 1112 of the first lens element comes in contact with the second contacting surface 1122 of the second lens element. An air duct 1116 is disposed on the first contacting surface 1111 of the first lens element, and another air duct 1117 is d posed on the second contacting surface 1112 of the first lens element. Both of the air duct 1116 and the air duct 1117 are closer to the center of the first lens element than the parting line 1114. Furthermore, a maximum depth of the air duct 1116 is H, H=0.0884 mm. A surface roughness of both of the first contacting surface 1111 of the first lens element and the second contacting surface 1112 of the first lens element is SR, SR=0.09 μm. An included angle formed by the first contacting surface 1111 of the first lens element and the second contacting surface 1112 of the first lens element is θ, θ=90 degrees.

12th Embodiment

Figure 13:
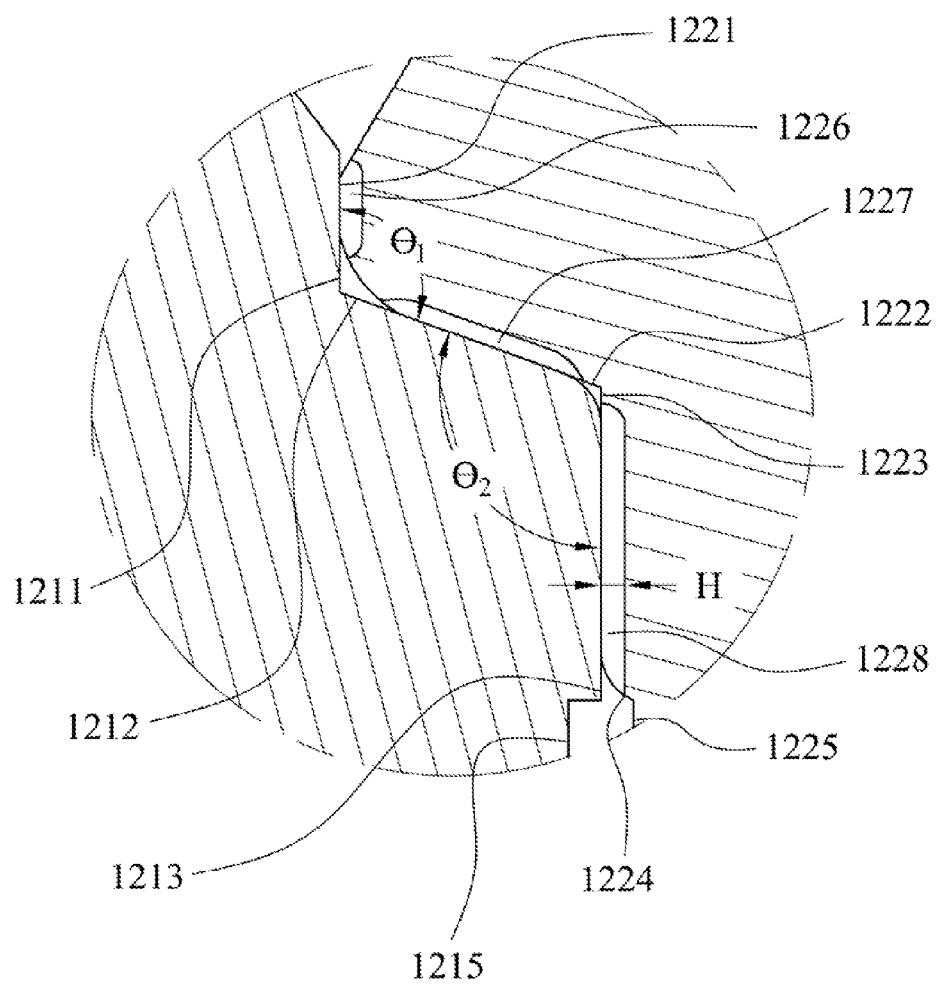
FIG. 13 is a partial cross-sectional view of an optical lens assembly according to the 12th embodiment of the present disclosure.

FIG. 13 is a partial cross-sectional view of an optical lens assembly according to the 12th embodiment of the present disclosure. A position of the partial cross-sectional view shown in FIG. 13 is correspondent to the position shown in FIG. 2C. The optical lens assembly includes a first lens element and a second lens element.

The first lens element made of plastic material includes a first contacting surface 1211, a second contacting surface 1212, a third contacting surface 1213, and an outer surface 1215, wherein the outer surface 1215 is located on the outer region of the first lens element.

The second lens element made of plastic material includes a first contacting surface 1221, a second contacting surface 1222, a third contacting surface 1223, a parting line 1224 and an outer surface 1225, wherein the outer surface 1225 is located on the outer region of the second lens element, and the outer surface 1225 and the parting line 1224 have a level difference. Furthermore, an extended plane of the parting line 1224 parallel with an optical axis Z is a parting plane (not otherwise herein provided).

The first contacting surface 1211 of the first lens element comes in contact with the first contacting surface 1221 of the second lens element. The second contacting surface 1212 of the first lens element comes in contact with the second contacting surface 1222 of the second lens element. The third contacting surface 1213 of the first lens element comes in contact with the third contacting surface 1223 of the second lens element. An air duct 1226 is disposed on the first contacting surface 1221 of the second lens element, another air duct 1227 is disposed on the second contacting surface 1222 of the second lens element, and still another air duct 1228 is disposed on the third contacting surface 1223 of the second lens element. All of the air duct 1226, the air duct 1227, and the air duct 1228 are closer to the center of the second lens element than the parting line 1224. Furthermore, a maximum depth of the air duct 1228 is H, H=0.0927 mm. A surface roughness of all of the first contacting surface 1221 of the second lens element, the second contacting surface 1222 of the second lens element, and the third contacting surface 1223 of the second lens element is SR. SR 0.004 μm. An included angle formed by the first contacting surface 1211 of the first lens element and the second contacting surface 1212 of the first lens element is $\theta_1$, $\theta_1$=120 degrees, and another included angle formed by the second contacting surface 1212 of the first lens element and the third contacting surface 1213 of the first lens element is $\theta_2$, $\theta_2$=120 degrees.

First Lens Element

Figure 14A:
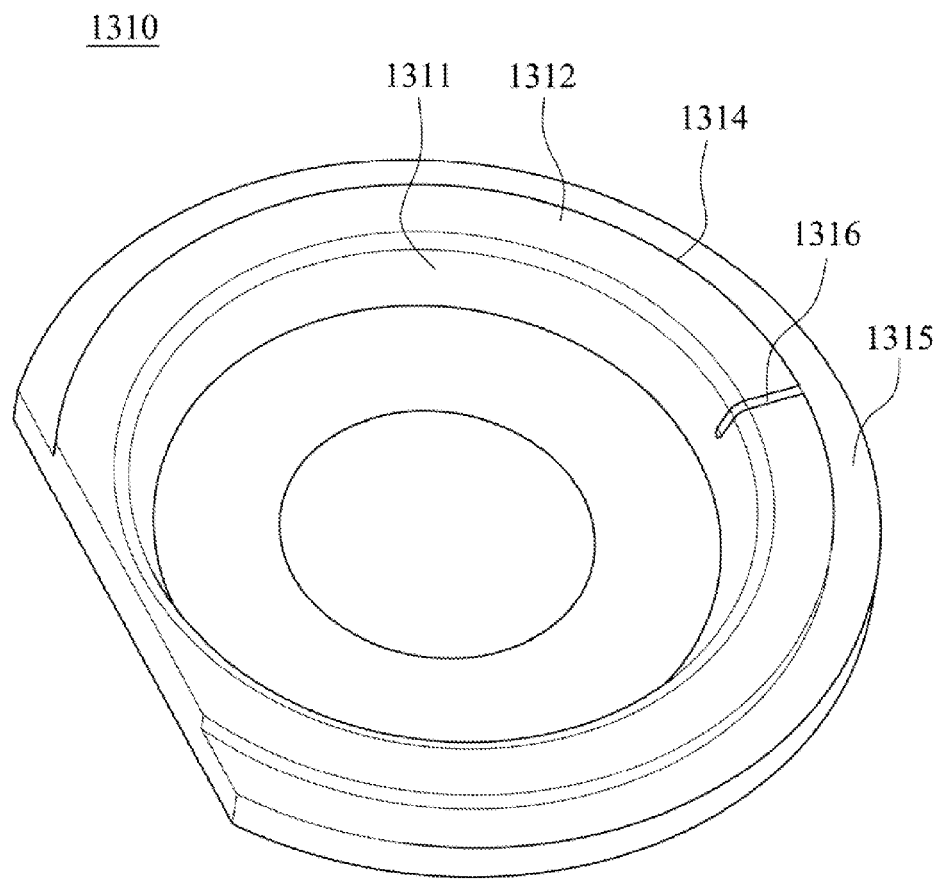
FIG. 14A is a three-dimensional view of a first lens element according to one embodiment of the present disclosure.
Figure 14B:
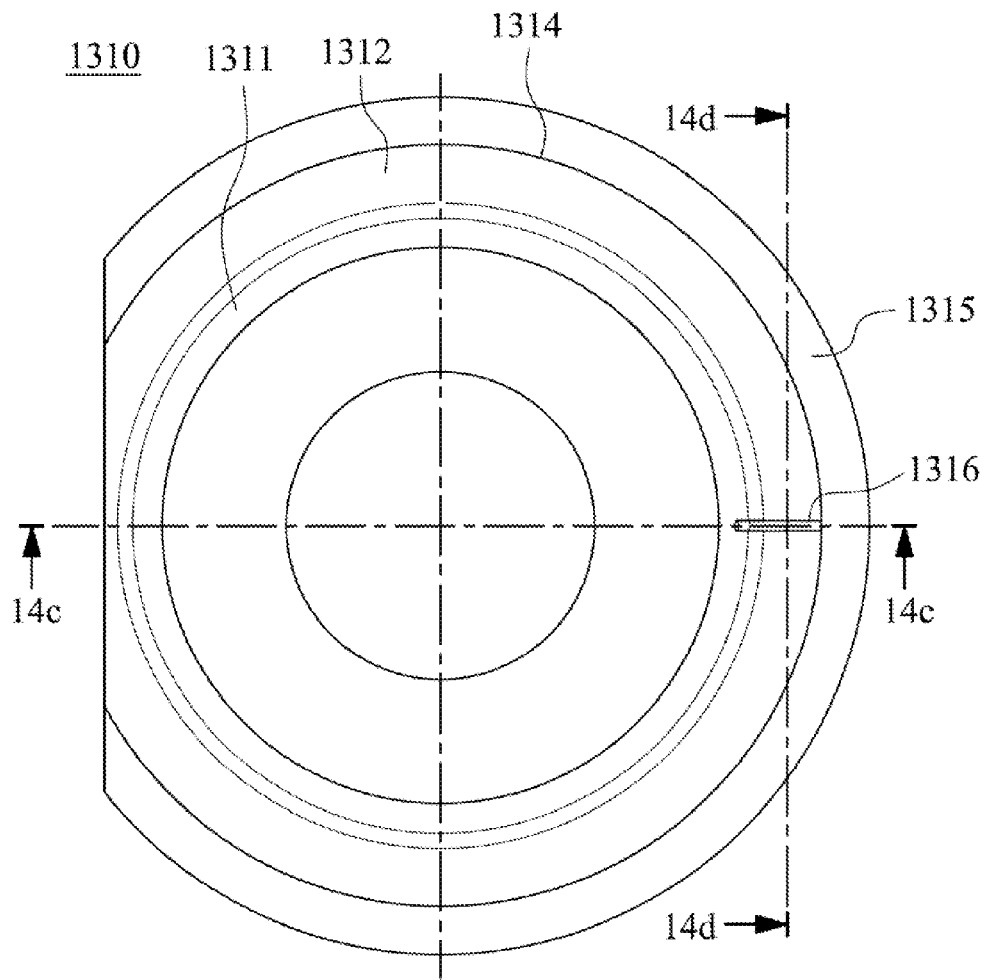
FIG. 14B is a top view of the first lens element in FIG. 14A.
Figure 14C:
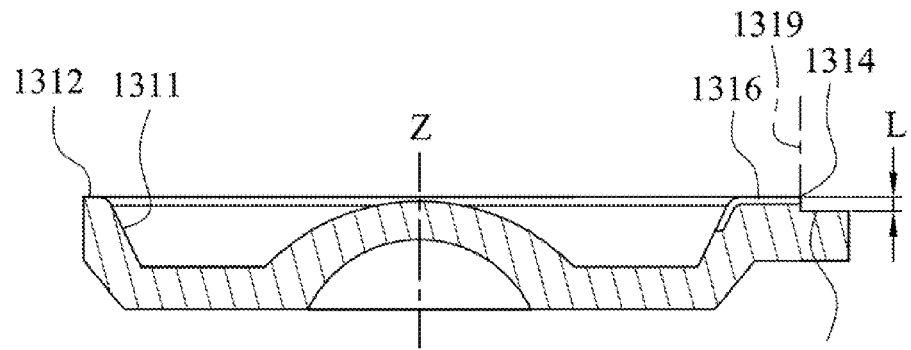
FIG. 14C is a cross-sectional view taken along line 14c-14c of the first lens element in FIG. 14B.

FIG. 14A is a three-dimensional view of a first lens element 1310 according to one embodiment of the present disclosure. FIG. 14B is a top view of the first lens element 1310 in FIG. 14A. FIG. 14C is a cross-sectional view taken along line 14c-14c of the first lens element 1310 in FIG. 14B. The first lens element 1310 made of plastic material includes a first contacting surface 1311, a second contacting surface 1312, a parting line 1314, and an outer surface 1315, wherein an air duct 1316 is disposed on both of the first contacting surface 1311 of the first lens element 1310 and the second contacting surface 1312 of the first lens element 1310, and the air duct 1316 is closer to the center of the first lens element 1310 than the parting line 1314.

In FIG. 14C, the outer surface 1315 is located on the outer region of the first lens element 1310, and the outer surface 1315 and the parting line 1314 have a level difference L. Furthermore, an extended plane of the parting line 1314 parallel with an optical axis z is a parting plane 1319.

Figure 15A:
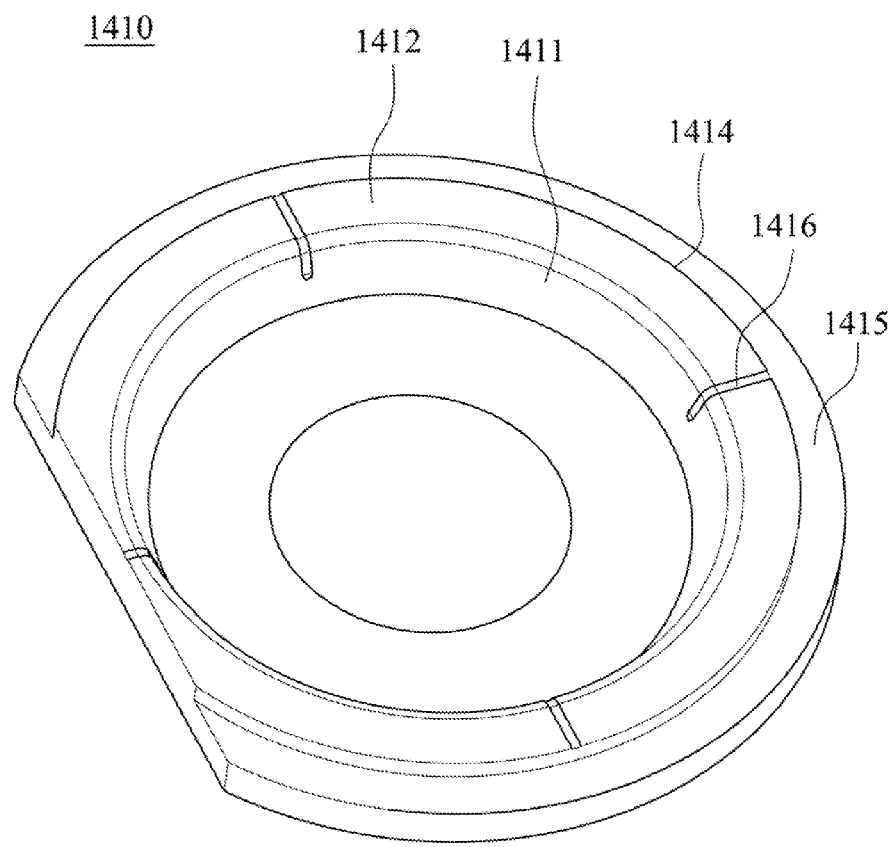
FIG. 15A is a three-dimensional view of a first lens element according to another embodiment of the present disclosure.
Figure 15B:
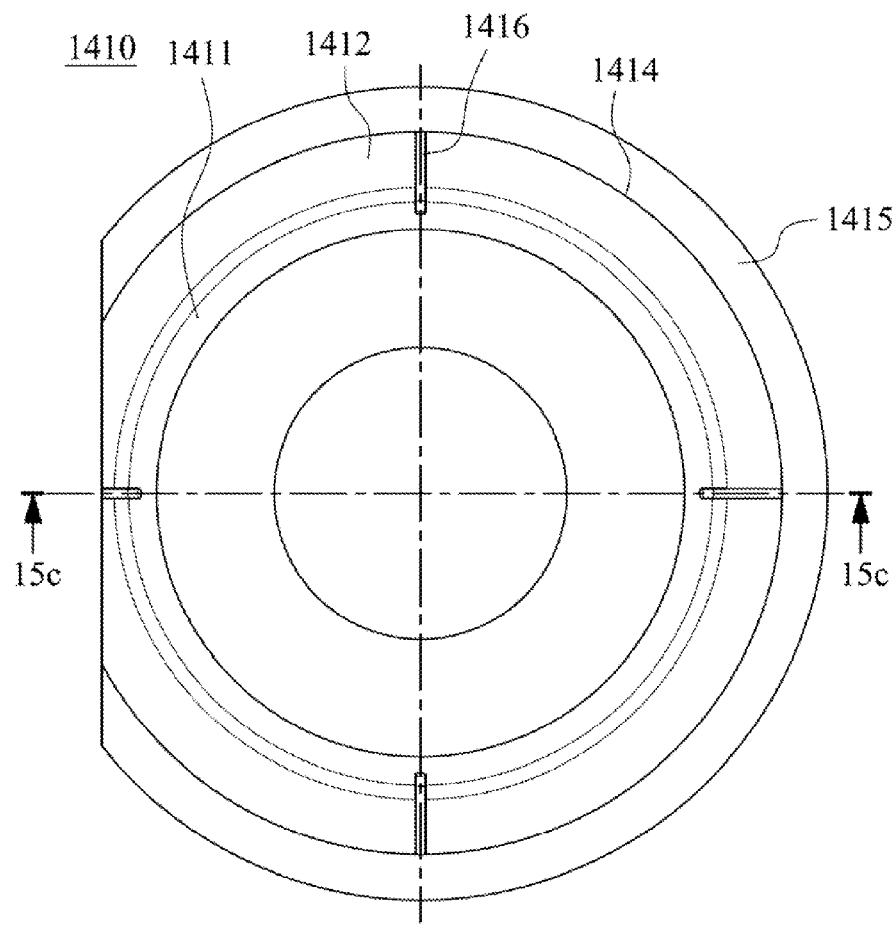
FIG. 15B is a top view of the first lens element in FIG. 15A.
Figure 15C:
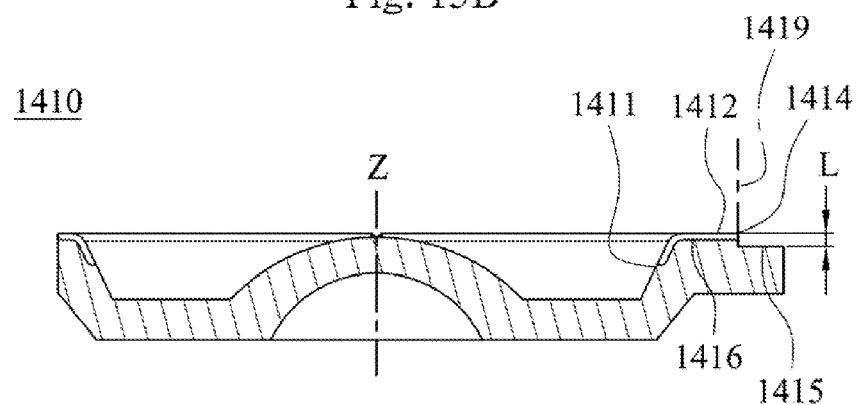
FIG. 15C is a cross-sectional view taken along line 15c-15c of the first lens element in FIG. 15B.

FIG. 15A is a three-dimensional view of a first lens element 1410 according to another embodiment of the present disclosure. FIG. 15B is a top view of the first lens element 1410 in FIG. 15A. FIG. 15C is a cross-sectional view taken along line 15c-15c of the first lens element 1410 in FIG. 15B. The first lens element 1410 made of plastic material includes a first contacting surface 1411, a second contacting surface 1412, a parting line 1414 and an outer surface 1415, wherein four air ducts 1416 are disposed on both of the first contacting surface 1411 of the first lens element and the second contacting surface 1412 of the first lens element, and the air ducts 1416 are closer to the center of the first lens element 1410 than the parting line 1414.

In FIG. 15C, the outer surface 1415 is located on the outer region of the first lens element 1410, and the outer surface 1415 and the parting line 1414 have a level difference L. Furthermore, an extended plane of the parting line 1414 parallel with an optical axis Z is a parting plane 1419.

Figure 16A:
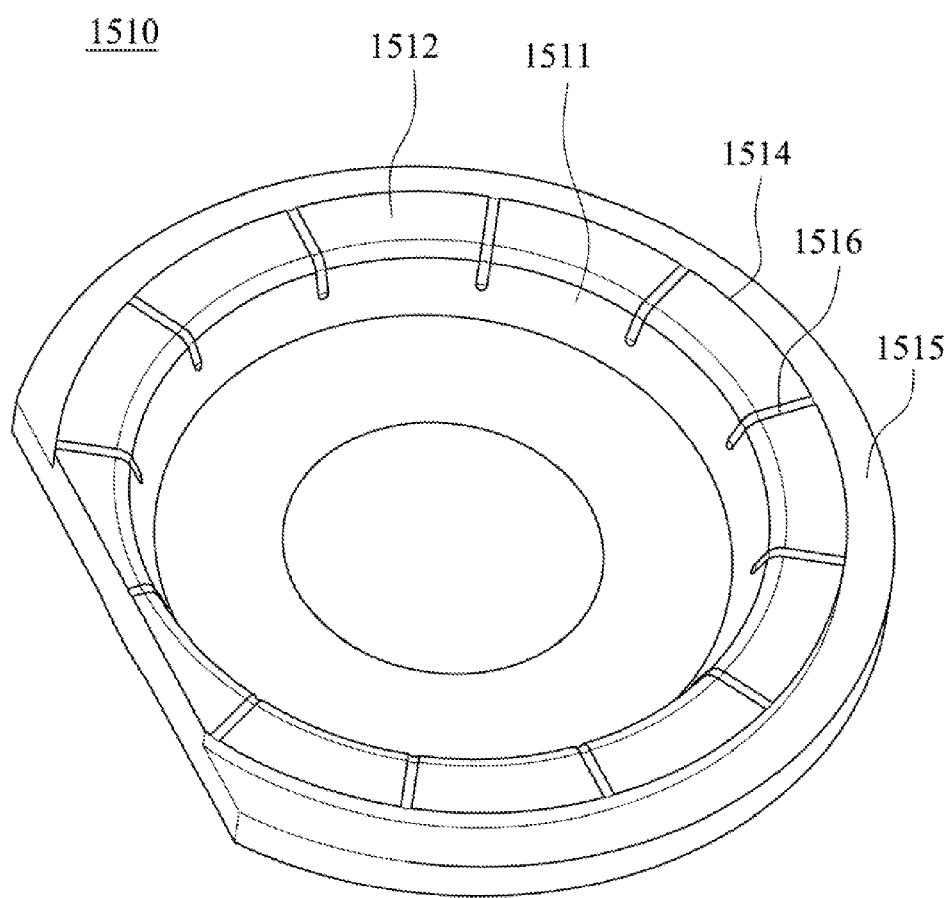
FIG. 16A is a three-dimensional view of a first lens element according to still another embodiment of the present disclosure.
Figure 16B:
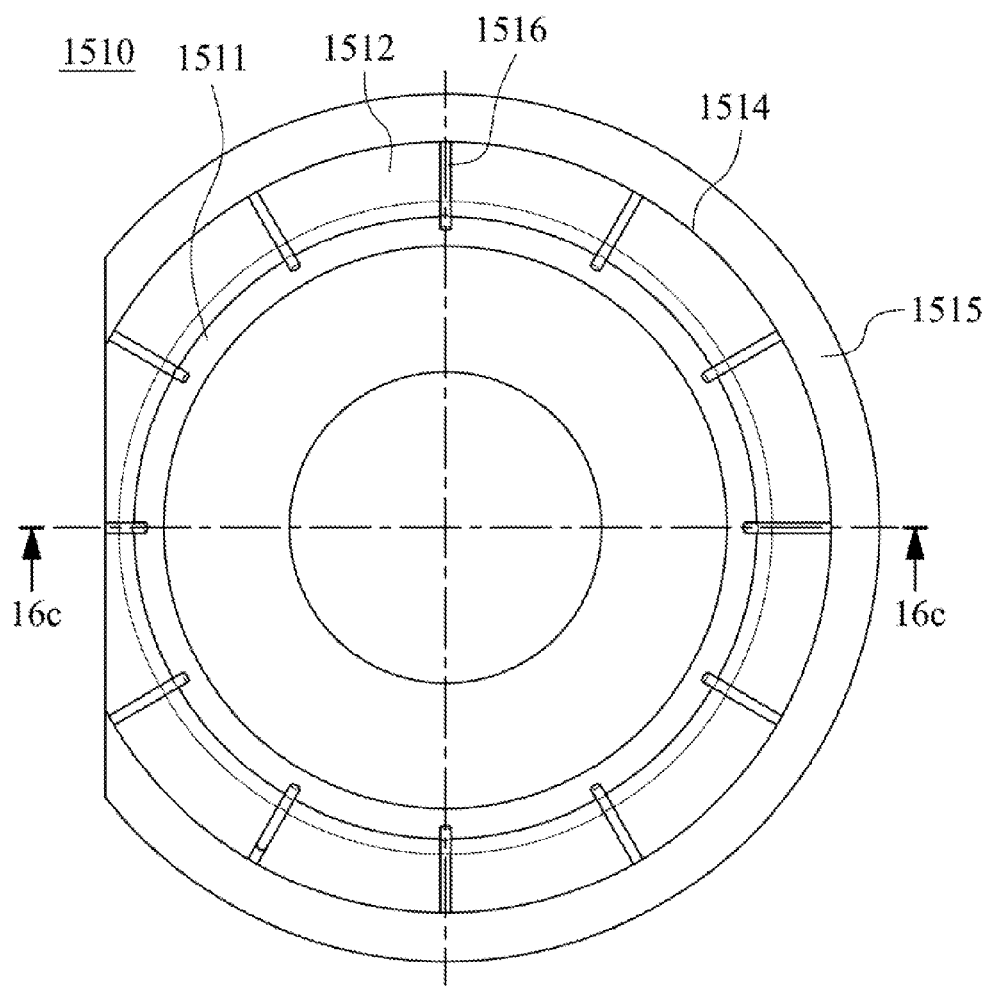
FIG. 16B is a top view of the first lens element in FIG. 16A.
Figure 16C:
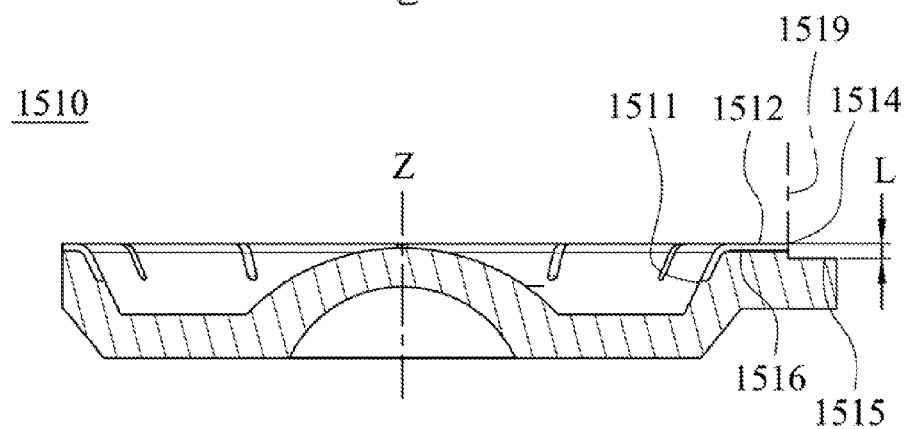
FIG. 16C is a cross-sectional view taken along line 16c-16c of the first lens element in FIG. 16B.

FIG. 16A is a three-dimensional view of a first lens element 1510 according to still another embodiment of the present disclosure. FIG. 16B is a top view of the first lens element 1510 in FIG. 16A. FIG. 16C is a cross-sectional view taken along line 16c-16c of the first lens element 1510 in FIG. 16B. The first lens element 1510 made of plastic material includes a first contacting surface 1511, a second contacting surface 1512, a parting line 1514, and an outer surface 1515, wherein twelve air ducts 1516 are disposed on both of the first contacting surface 1511 of the first lens element 1510 and the second contacting surface 1512 of the first lens element 1510, and the air ducts 1513 are closer to the center of the first lens element 1510 than the parting line 1514.

In FIG. 16C, the outer surface 1515 is located on the outer region of the first lens element 1510, and the outer surface 1515 and the parting line 1514 have a level difference L. Furthermore, an extended plane of the parting line 1514 parallel with an optical axis Z is a parting plane 1519.

Figure 17A:
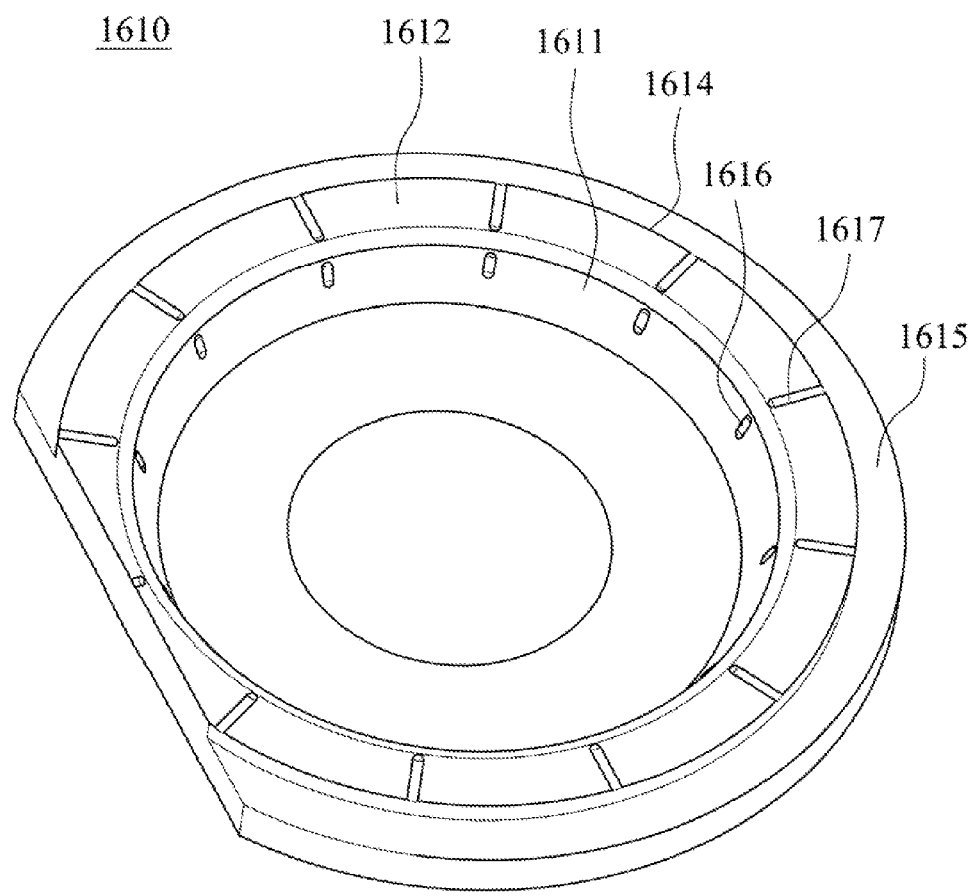
FIG. 17A is a three-dimensional view of a first lens element according to yet another embodiment of the present disclosure.
Figure 17B:
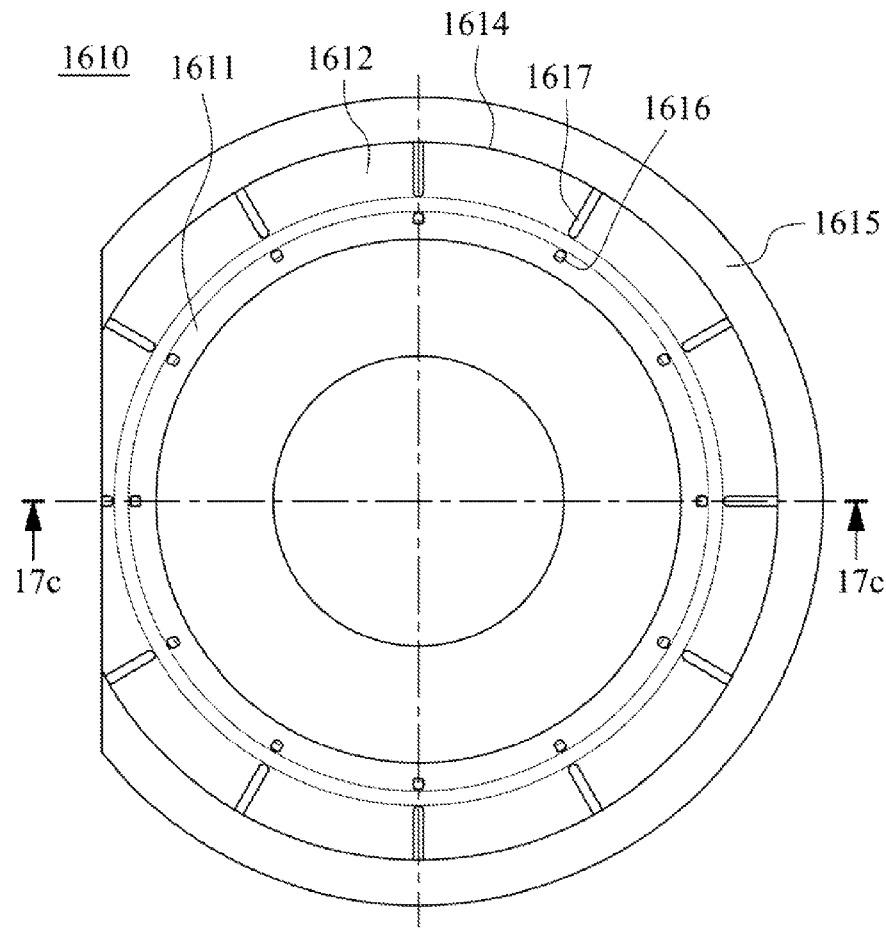
FIG. 17B is a top view of the first lens element in FIG. 17A.
Figure 17C:
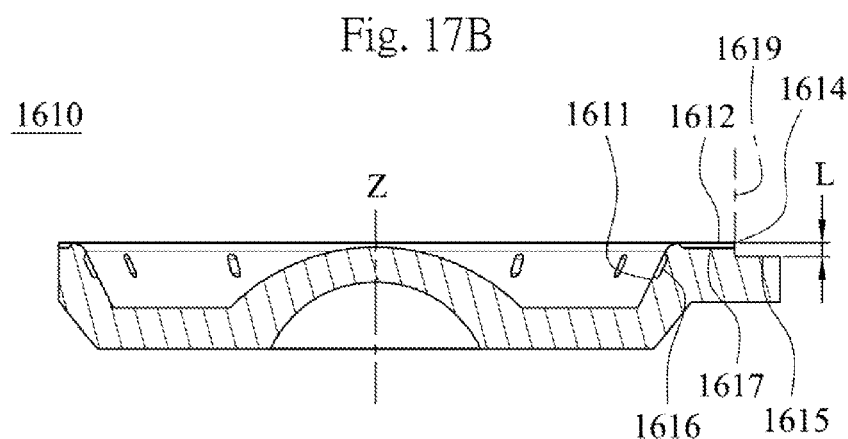
FIG. 17C is a cross-sectional view taken along line 17c-17c of the first lens element in FIG. 17B.

FIG. 17A is a three-dimensional view of a first lens element 1610 according to yet another embodiment of the present disclosure. FIG. 17B is a top view of the first lens element 1610 in FIG. 17A. FIG. 17C is a cross-sectional view taken along line 17c-17c of the first lens element 1610 in FIG. 17B. The first lens element 1610 made of plastic material includes a first contacting surface 1611, a second contacting surface 1612, a parting line 1614, and an outer surface 1615, wherein twelve air ducts 1616 are disposed on the first contacting, surface 1611 of the first lens element 1610, and another twelve air ducts 1617 are disposed on the second contacting surface 1612 of the first lens element 1610. Furthermore, the air ducts 1616 and the air ducts 1617 are both closer to the center of the first lens element 1610 than the parting line 1614.

In FIG. 17C, the outer surface 1615 is located on the outer region of the first lens element 1610, and the outer surface 1615 and the parting line 1614 have a level difference L. Furthermore, an extended plane of the parting line 1614 parallel with an optical axis Z is a parting plane 1619.

Bottom of Air Duct

Figure 18:
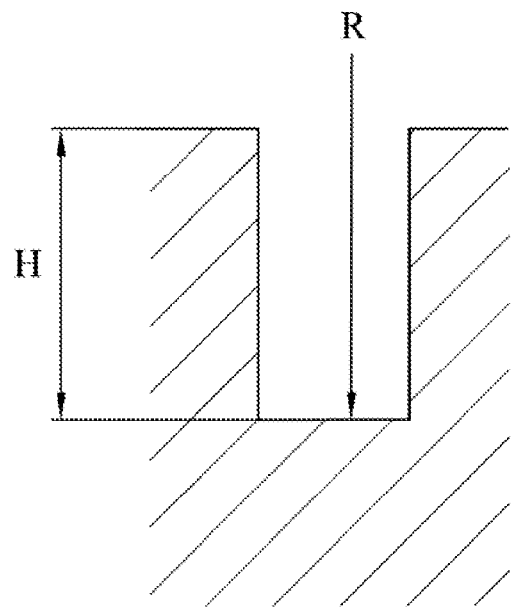
FIG. 18 is a cross-sectional view according to one air duct of present disclosure.

FIG. 18 is a cross-sectional view according to one air duct of present disclosure, and FIG. 18 is a cross-sectional view taken along line 14d-14d of FIG. 14B. In FIG. 18, a curvature radius of a bottom of the air duct is R, and the following condition is satisfied: R=∞.

Figure 19:
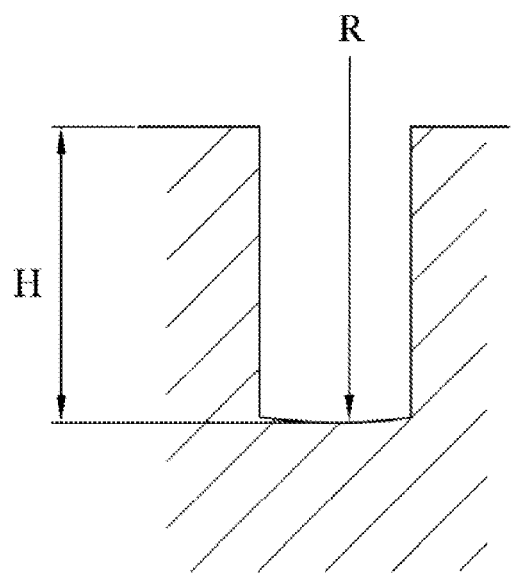
FIG. 19 is a cross-sectional view according to another air duct of present disclosure.

FIG. 19 is a cross-sectional view according to another air duct of present disclosure, and FIG. 19 is a cross-sectional view taken along line 14*d*-14*d* of FIG. 14B. In FIG. 19, a curvature radius of a bottom of the air duct is R, and the following condition is satisfied: R=60.53 mm.

Figure 20:
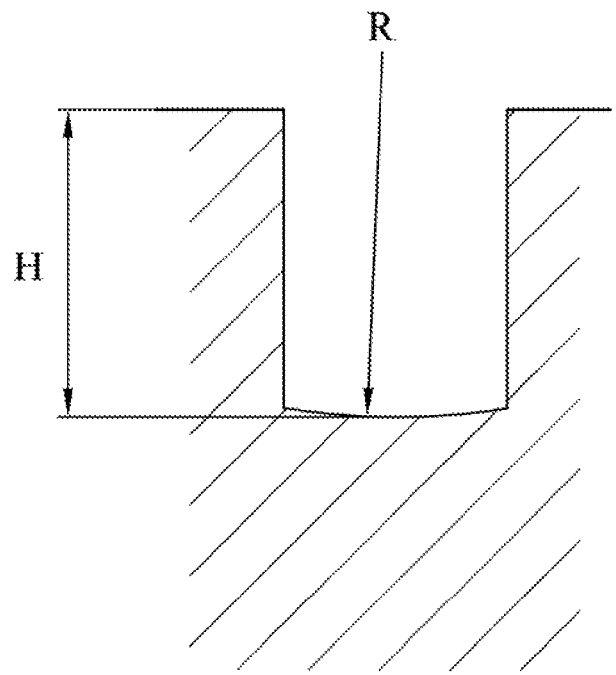
FIG. 20 is a cross-sectional view according to still another air duct of present disclosure.

FIG. 20 is a cross-sectional view according to still another air duct of present disclosure, and FIG. 20 is a cross-sectional view taken along line 14*d*-14*d* of FIG. 14B. In FIG. 20, a curvature radius of a bottom of the air duct is R, and the following condition is satisfied: R=5.67 mm.

Figure 21:
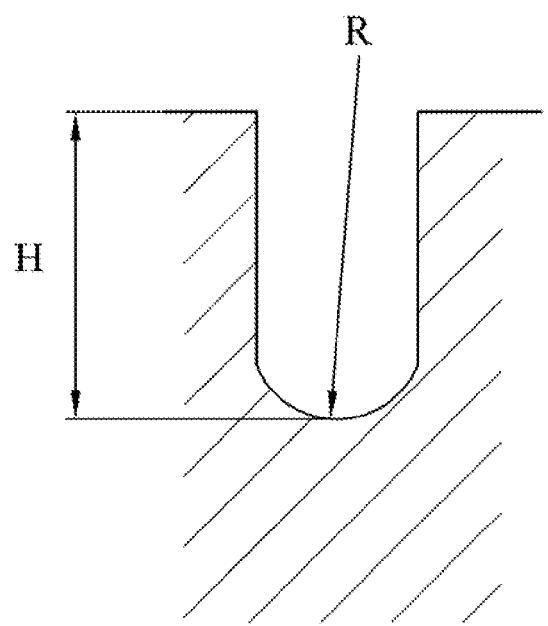
FIG. 21 is a cross-sectional view according to yet another air duct of present disclosure.

FIG. 21 is a cross-sectional view according to yet another air duct of present disclosure, and FIG. 21 is a cross-sectional view taken along line 14*d*-14*d* of FIG. 14B. In FIG. 21, a curvature radius of a bottom of the air duct is R, and the following condition is satisfied: R=0.68 mm.

Figure 22:
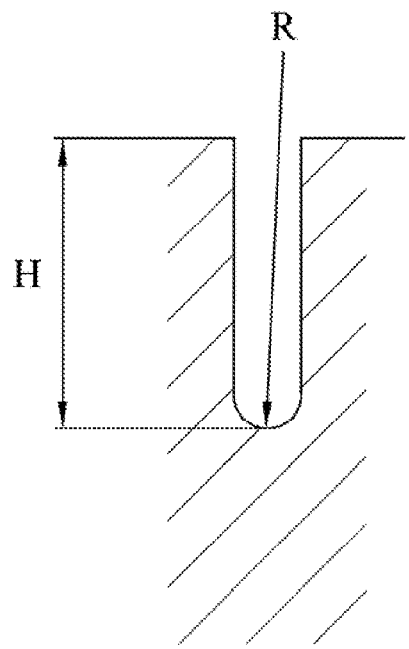
FIG. 22 is a cross-sectional view according to still yet another air duct of present disclosure.

FIG. 22 is a cross-sectional view according to still yet another air duct of present disclosure, and FIG. 22 is a cross-sectional view taken along line 14*d*-14*d* of FIG. 14B. In FIG. 22, a curvature radius of a bottom of the air duct is R, and the following condition is satisfied: R=0.28 mm.

Figure 23:
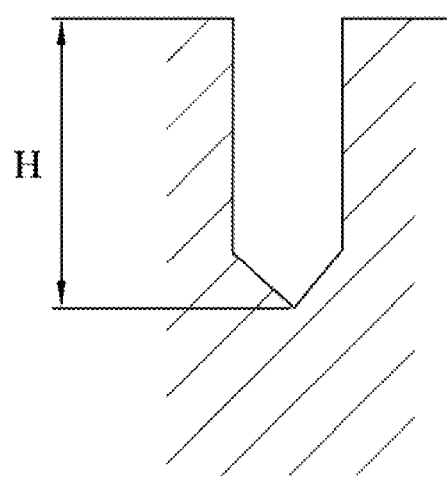
FIG. 23 is a cross-sectional view according to a further air duct of present disclosure.

FIG. 23 is a cross-sectional view according to a further air duct of present disclosure, and FIG. 23 is a cross-sectional view taken along line 14*d*-14*d* of FIG. 14B. In FIG. 23, a bottom of the air duct forms a V shape.

In FIG. 18 to FIG. 23, the bottom shape of the air duct can be varied according to its practical needs. It is thereby favorable for molding and manufacturing of lens elements and increasing the efficiency of exhausting air from air cavity during assembly.

According to the optical lens assembly of the present disclosure, "the first" and "the second", which are the ordinal numbers of the first lens element and the second lens element, are only used for denomination, but not for sequence. The first lens element and the second lens element can have similar or different structures. The first lens element and the second lens element can also have similar or different surface roughness. Furthermore, "the first" "the second" and "the third", which are the ordinal numbers among the first contacting surface, the second contacting surface and the third contacting surface, are only for denomination, but not for sequence.

According to the optical lens assembly of the present disclosure, the first lens element and the second lens element both include an effective optical region and a peripheral region, wherein each of the contacting surfaces is disposed on a peripheral region of a lens element.

According to the optical lens assembly of the present disclosure, surface roughness (SR) can be expressed as center line average roughness (Ra) under selecting a reference length (0.05 mm, 0.1 mm 0.2 mm, 0.4 mm, 0.8 mm or 1.6 mm), wherein Ra is the mean of the absolute values of the distances between roughness curves and the center line. The center line average roughness (Ra) is also called arithmetic mean roughness value, and the unit thereof is μm.

According to the optical lens assembly of the present disclosure, the surface of the lens element may be processed using different techniques such as electro-chemical grinding (E.C.G burnishing, polishing, lapping or superfinishing.

The foregoing description, for purpose of explanation, has been described with reference to specific embodiments. It is to be noted that every table show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising:
a first lens element having at least two contacting surfaces formed on an object-side surface or an image-side surface thereof; and
a second lens element having at least two contacting surfaces formed on an object-side surface or an image-side surface thereof;
wherein the contacting surfaces of the first lens element come in contact with the contacting surfaces of the second lens element, and at least two air ducts are disposed on at least two different contacting surfaces of the contacting surfaces of the first lens element and the contacting surfaces of the second lens element; the air ducts on the contacting surfaces have different cross section shapes; the at least two air ducts on the at least two different contacting surfaces are configured to form continuous air duct channels to communicate the air inside and outside of the optical lens assembly; the air duct channels are circumferentially spaced apart;
wherein at least one of the first lens element and the second lens element further comprises a parting line, and each of the air ducts is closer to an optical axis than the parting line;
wherein a maximum depth of the at least two air ducts is H, and the following condition is satisfied:
0.008 mm≤H≤0.1314 mm.

2. The optical lens assembly of claim 1, wherein a surface roughness of the at least two contacting surfaces where the air ducts are disposed on is SR, and the following condition is satisfied:
SR≤0.1 μm.

3. The optical lens assembly of claim 2, wherein the surface roughness of the at least two contacting surfaces where the air ducts are disposed on is SR, and the following condition is satisfied:
SR≤0.01 μm.

4. The optical lens assembly of claim 1, wherein the air ducts are disposed on one of the contacting surfaces of the first lens element, and the first lens element further comprises:
the parting line, wherein each of the air ducts of the first lens element is closer to an optical axis than the parting line.

5. The optical lens assembly of claim 4, wherein other plurality of air ducts are disposed on one of the contacting surface of the second lens element, and the second lens element further comprises:
the parting line, wherein each of the air ducts of the second lens element is closer to the optical axis than the parting line.

6. The optical lens assembly of claim 1, wherein both of the first lens element and the second lens element are made of plastic material.

7. The optical lens assembly of claim 1, wherein a curvature radius of a bottom of the at least two air ducts is R, and the following condition is satisfied:
R>0 mm.

8. An optical lens assembly comprising:
a first lens element having at least two contacting surfaces formed on an object-side surface or an image-side surface thereof; and
a second lens element having at least two contacting surfaces formed on an object-side surface or an image-side surface thereof;
wherein the contacting surfaces of the first lens element come in contact with the contacting surfaces of the second lens element, and at least two air ducts are disposed on at least two different contacting surfaces of the contacting surfaces of the first lens element and the contacting surfaces of the second lens element; the air ducts on the contacting surfaces have different cross section shapes; the at least two air ducts on the at least two different contacting surfaces are configured to form continuous air duct channels to communicate the air inside and outside of the optical lens assembly; the air duct channels are circumferentially spaced apart;
wherein at least one of the first lens element and the second lens element further comprises a parting line, and each of the air ducts is closer to an optical axis than the parting line;
wherein the two contacting surfaces of the first lens element are adjacent and form an included angle θ, a maximum depth the at least two air ducts is H, and the following conditions are satisfied:
90 degrees<θ≤180 degrees; and
0.008 mm≤H≤0.1314 mm.

9. The optical lens assembly of claim 8, wherein the two contacting surfaces of the first lens element form the included angle θ, and the following condition is satisfied:
90 degrees≤θ≤145 degrees.

10. The optical lens assembly of claim 8, wherein a surface roughness of the at least two contacting surfaces where the air ducts are disposed on is SR, and the following condition is satisfied:
SR≤0.1 μm.

11. The optical lens assembly of claim 10, wherein the surface roughness of the at least two contacting surfaces where the air ducts are disposed on is SR, and the following condition is satisfied:
SR≤0.01 μm.

12. The optical lens assembly of claim 8, wherein the air ducts are disposed on one of the contacting surfaces of the first lens element, and the first lens element further comprises:
the parting line, wherein each of the air ducts of the first lens element is closer to an optical axis than the parting line.

13. The optical lens assembly of claim 12, wherein other plurality of air ducts are disposed on one of the contacting surfaces of the second lens element, and the second lens element further comprises:
the parting line, wherein each of the air ducts of the second lens element is closer to the optical axis than the parting line.

14. The optical lens assembly of claim 8, wherein both of the first lens element and the second lens element are made of plastic material.

15. The optical lens assembly of claim 8, wherein a curvature radius of a bottom of the at least two air ducts is R, and the following condition is satisfied:
R>0 mm.

16. The optical lens assembly of claim 8, wherein a bottom of the at least two air ducts forms a V shape.

17. An optical lens assembly comprising:
a first lens element having at least two contacting surfaces formed on an object-side surface or an image-side surface thereof; and
a second lens element having at least two contacting surfaces formed on an object-side surface or an image-side surface thereof;
wherein the contacting surfaces of the first lens element come in contact with the contacting surfaces of the second lens element, and at least two air ducts are disposed on at least two different contacting surfaces of the contacting surfaces of the first lens element and the contacting surfaces of the second lens element; the air ducts on the contacting surfaces have different cross section shapes; the at least two air ducts on the at least two different contacting surfaces are configured to form continuous air duct channels to communicate the air inside and outside of the optical lens assembly; the air duct channels are circumferentially spaced apart;
wherein at least one of the first lens element and the second lens element further comprises a parting line, and each of the air ducts is closer to an optical axis than the parting line;
wherein a bottom of the at least two air ducts forms a V shape, a maximum depth of the at least two air ducts is H, and the following condition is satisfied:
0.008 mm≤H≤0.1314 mm.

18. The optical lens assembly of claim 17, wherein a surface roughness of the at least two contacting surfaces where the air ducts are disposed on is SR, and the following condition is satisfied:
SR≤0.1 μm.

19. The optical lens assembly of claim 18, wherein the surface roughness of the at least two contacting surfaces where the air ducts are disposed on is SR, and the following condition is satisfied:
SR≤0.01 μm.

20. The optical lens assembly of claim 17, wherein the air ducts are disposed on one of the contacting surfaces of the first lens element, and the first lens element further comprises:
the parting line, wherein each of the air ducts of the first lens element is closer to an optical axis than the parting line.

21. The optical lens assembly of claim 20, wherein other plurality of air ducts are disposed on one of the contacting surfaces of the second lens element, and the second lens element further comprises:
the parting line, wherein each of the air ducts of the second lens element is closer to the optical axis than the parting line.

22. The optical lens assembly of claim 17, wherein both of the first lens element and the second lens element are made of plastic material.

* * * * *